(12) United States Patent
Ikari et al.

(10) Patent No.: US 6,321,535 B2
(45) Date of Patent: Nov. 27, 2001

(54) HYDRAULIC CIRCUIT FOR WORKING VEHICLE

(75) Inventors: Masanori Ikari; Motoki Oba, both of Sayama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/742,702

(22) Filed: Feb. 23, 2001

Related U.S. Application Data

(62) Division of application No. 09/197,852, filed on Nov. 23, 1998, now abandoned.

(30) Foreign Application Priority Data

Nov. 21, 1997 (JP) .................................................. 9-369867
Jul. 13, 1998 (JP) ................................................. 10-214850

(51) Int. Cl.$^7$ .................................................. F16D 31/02
(52) U.S. Cl. .............................................. 60/421; 60/449
(58) Field of Search ............................ 60/449, 421, 422, 60/452

(56) References Cited

U.S. PATENT DOCUMENTS

| | | | |
|---|---|---|---|
| 4,017,215 | 4/1977 | Butler | 417/216 |
| 4,479,349 | * 10/1984 | Westveer | 60/422 |
| 4,537,029 | * 8/1985 | Gunda et al. | 60/452 |
| 5,127,227 | * 7/1992 | Ikari | 60/421 |
| 5,421,705 | 6/1995 | Benckert | 417/218 |

\* cited by examiner

Primary Examiner—Edward K. Look
Assistant Examiner—Thomas E. Lazo
(74) Attorney, Agent, or Firm—Sidley Austin Brown & Wood

(57) ABSTRACT

A hydraulic circuit for a loader vehicle includes a working machine hydraulic circuit, a steering hydraulic circuit, a variable displacement auxiliary hydraulic pump, in which the displacement volume becomes smaller as the operating oil pressure becomes higher, when the operating oil pressure exceeds a predetermined oil pressure by receiving the operating oil pressure of the working machine hydraulic circuit, and a flow dividing valve for switching and supplying oil discharge from the auxiliary hydraulic pump to either one of the hydraulic circuits with a priority being given to the steering hydraulic circuit. A pump capacity control device includes a working machine hydraulic actuator, a working machine hydraulic pump, a steering pump, a steering pump capacity servo, a working machine load sensor, and an engine speed sensor.

3 Claims, 15 Drawing Sheets

FIG. 1
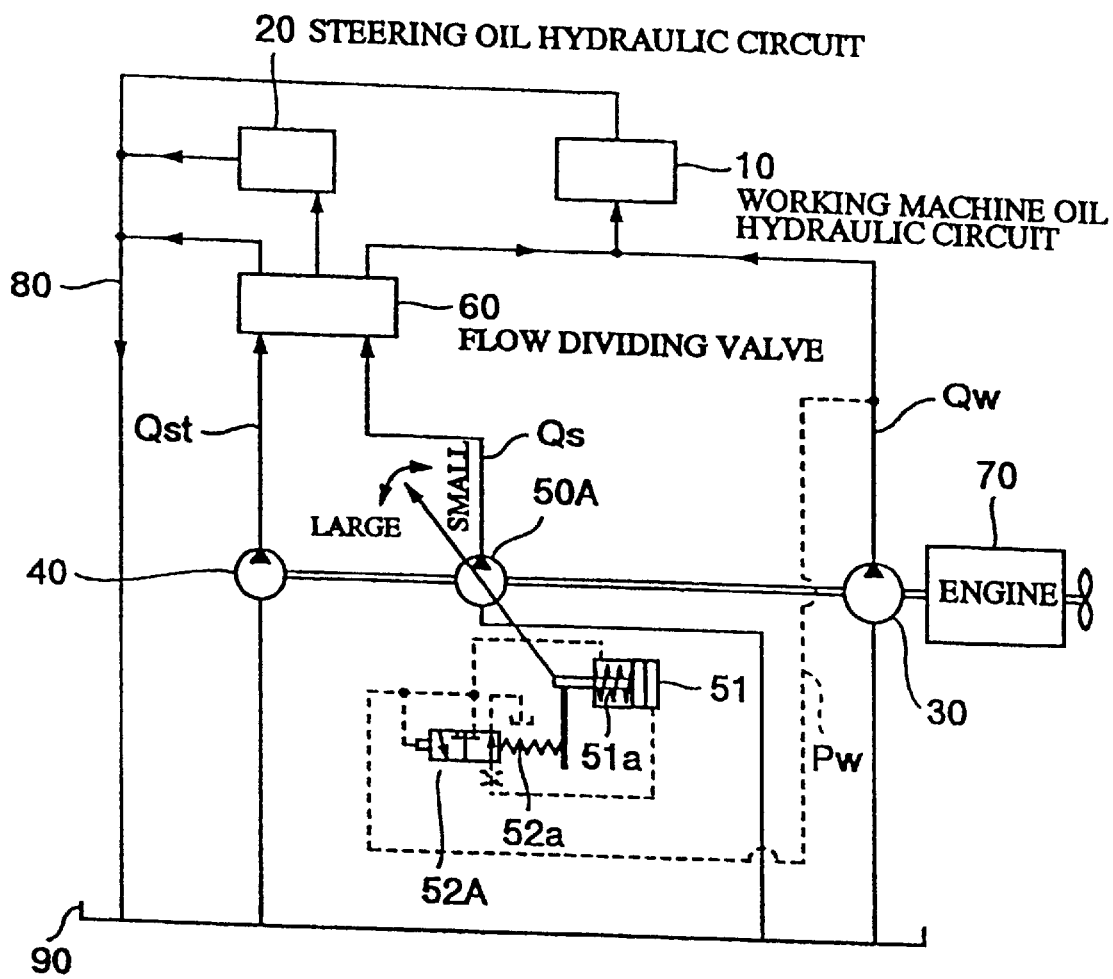
FIG. 2A  FIG. 2B  FIG. 2C
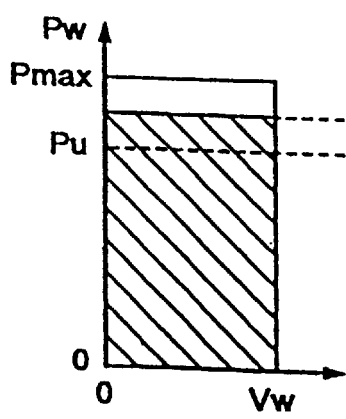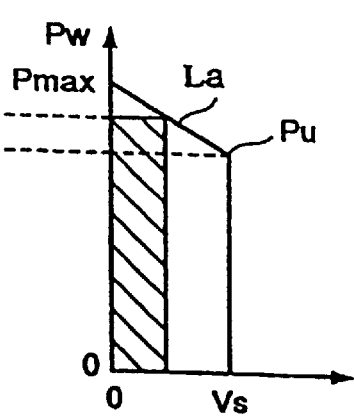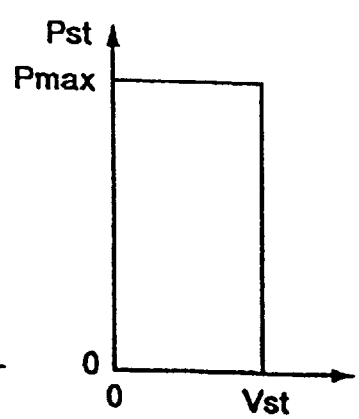

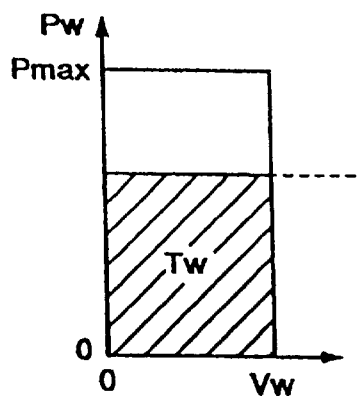 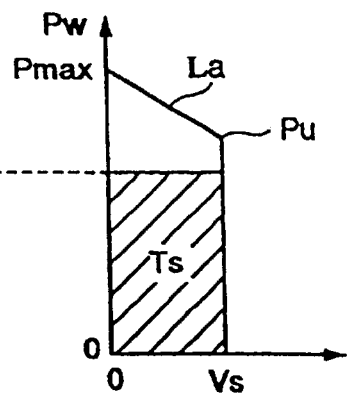 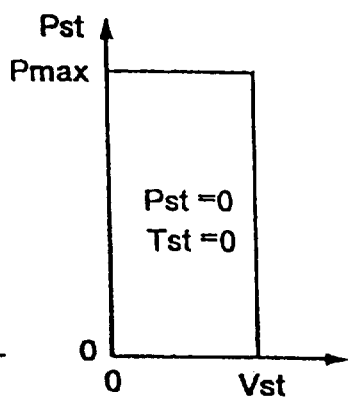
FIG. 4A    FIG. 4B    FIG. 4C
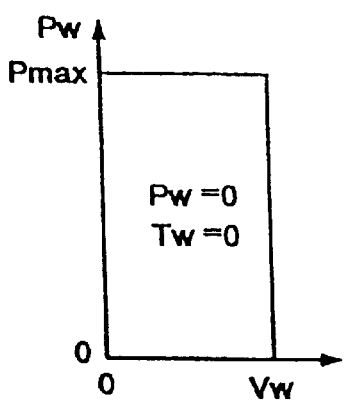 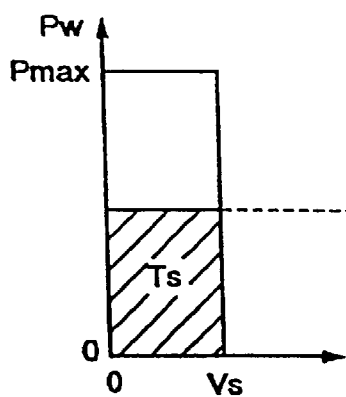 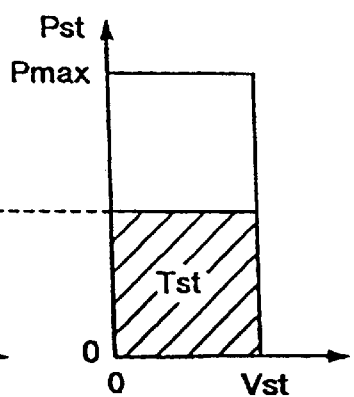
FIG. 5A    FIG. 5B    FIG. 5C
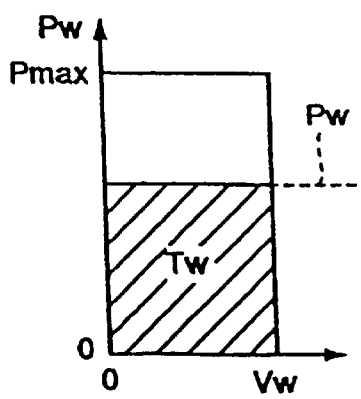 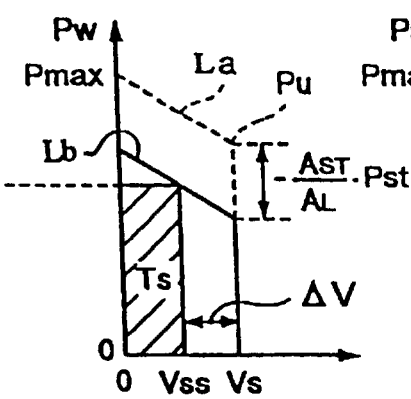 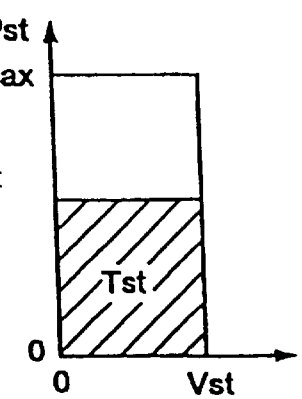
FIG. 6A    FIG. 6B    FIG. 6C F I G. 1 2
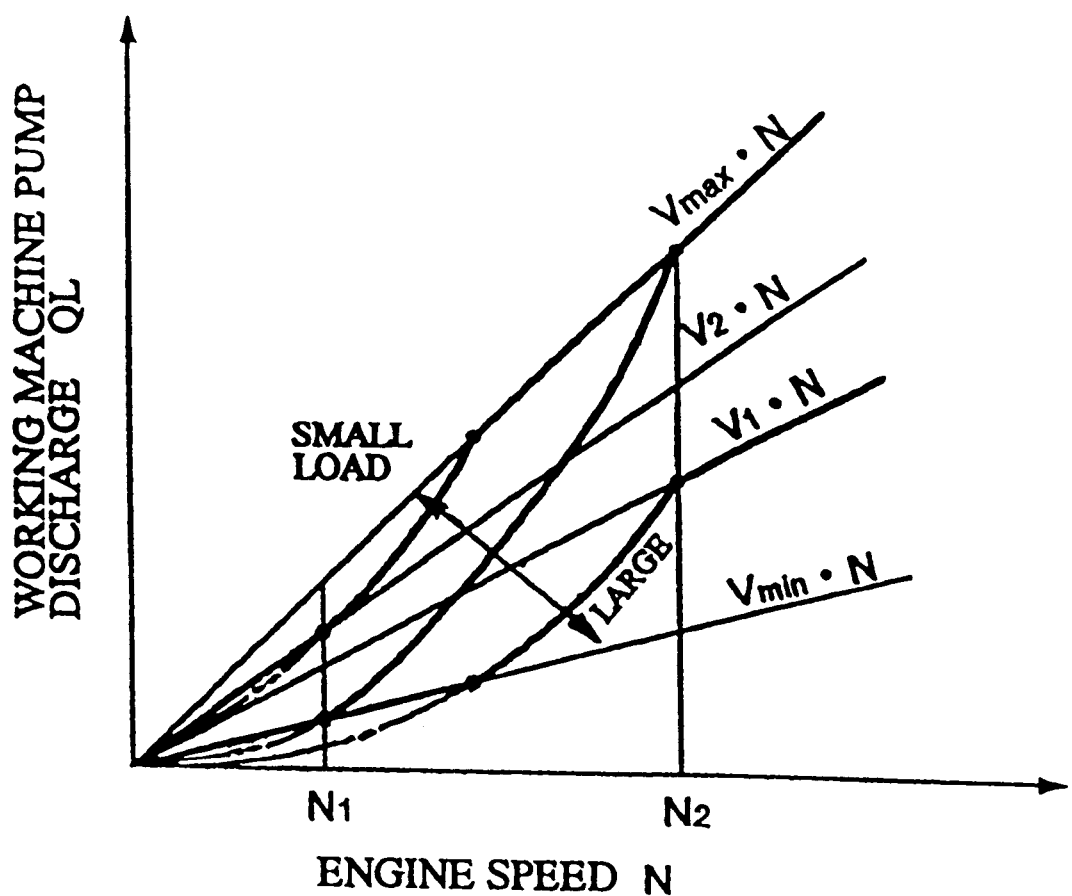

F I G. 1 7
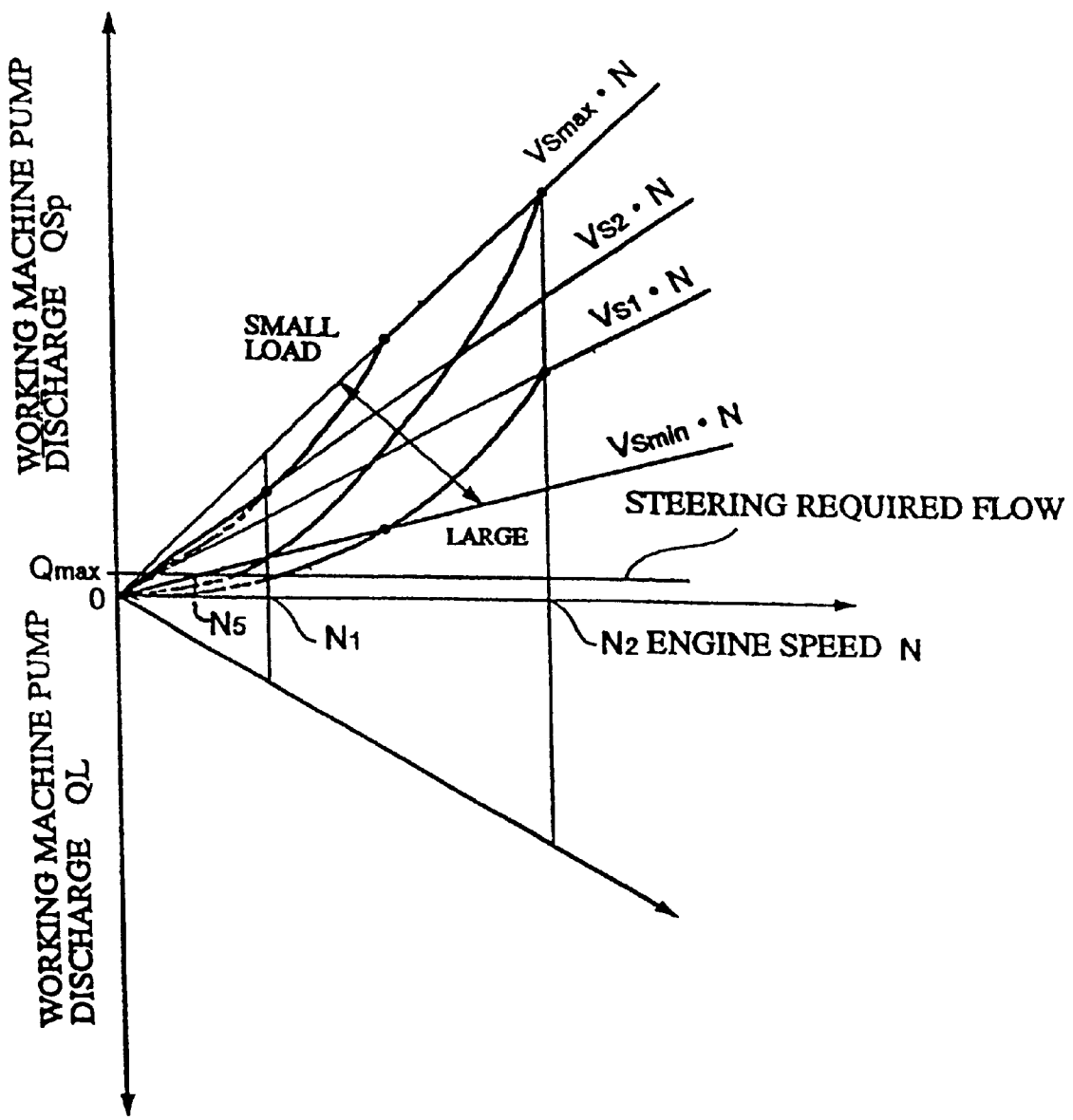

F I G. 2 1 CONVENTIONAL ART

HYDRAULIC CIRCUIT FOR WORKING VEHICLE

This application is a divisional of U.S. application Ser. No. 09/197,852, filed Nov. 23, 1998, now abandoned.

TECHNICAL FIELD

The present invention relates to oil pressure control for a working vehicle, and the invention particularly relates to a hydraulic circuit for a loader vehicle and to a pump capacity control device for a working vehicle.

BACKGROUND ART

A loader vehicle, for example, a wheel loader (hereinafter, simply called "the vehicle") has a working machine at the front portion of the vehicle body. The working machine has a boom, with the rear end of the boom being coupled to the front portion of the vehicle body via pivot pins, and a bucket, coupled at the front end of the boom via pivot pins. As shown in FIG. 18, the boom is rotatable around the pin coupling at the rear end of the boom via the operation of the boom cylinder 11, and the bucket is rotatable around the pin coupling at the front end of the boom via operation of the bucket cylinder 12. Specifically, the vehicle has a working machine hydraulic circuit 10. It is normal to include a steering hydraulic circuit 20 together with the hydraulic circuit 10.

Incidentally, the steering circuit, as well as the brake, is a safety element of a vehicle. For this reason, in some vehicles, the working machine hydraulic circuit 10 receives pressurized oil discharged from a working machine hydraulic pump 30 at a flow rate Qw, and the steering hydraulic circuit 20 receives pressurized oil discharged from a steering hydraulic pump 40 at a flow rate Qst, whereby the circuits 10 and 20 are independent from each other. Such a vehicle further has an auxiliary hydraulic pump 50 and a flow dividing valve 60, which is connected to the pumps 40 and 50 and to the circuits 10 and 20 in order to use the engine torque efficiently. The operation of the flow dividing valve 60 is as follows.

At a medium or higher speed of the engine 70, the flow Qst of pressurized oil, discharged from the steering hydraulic pump 40, is sufficient for the steering hydraulic circuit 20. Accordingly, at this time, the flow dividing valve 60 supplies pressurized oil at a flow Qs from the auxiliary hydraulic pump 50 to the working machine hydraulic circuit 10. However, when a steering operation is carried out at a low speed of the engine 70 (at so-called minimum idling engine speed), the oil flow rate Qst is not sufficient for the steering hydraulic circuit 20, and a quick steering operation cannot be conducted. The flow dividing valve 60 then supplies pressurized oil, discharged from the auxiliary pump 50, to the steering hydraulic circuit 20 at the flow rate Qs. Incidentally, oil which has flowed through either of the circuits 10 and 20 returns to a tank 90 by way of a drain circuit 80. Each of the hydraulic pumps 30, 40, and 50 is a fixed displacement type. Some vehicles are equipped with variable displacement type hydraulic pumps, but their variable control does not serve the purpose of the present invention, the details of which will be described below; therefore, in the present invention such a variable displacement type hydraulic pump is considered as a fixed displacement type.

In the vehicle, the operating oil pressure Pw becomes lower during an operation with a low load (for example, when the boom is being raised with a load in the bucket). At this time, the higher the oil flow in the working machine hydraulic circuit 10, the higher the boom ascending speed becomes, and the higher the working speed becomes. On the other hand, during an operation with a high load (for example, during rock excavation by the bucket), the oil pressure of the working machine hydraulic circuit 10 (hereinafter referred to as "operating oil pressure Pw") becomes higher. At this time, the necessary flow of pressurized oil in the working machine hydraulic circuit 10 may be smaller. Then there is an example having an unload circuit 100 to which the oil flow Qs, heading for the working machine hydraulic circuit 10 from the flow dividing valve 60, is drained to the tank 90 when the operating oil pressure Pw exceeds a previously specified oil pressure Pu (hereinafter referred to as "unloaded condition starting pressure Pu"), and is raised to be higher (specifically "Pmax≧Pw>Pu"). Here, "Pmax" is the relief oil pressure of the working machine hydraulic circuit 10. The details are as follows.

For example, the unloaded circuit 100 in FIG. 18 has: a check valve 101, which opens in one direction toward the working machine hydraulic circuit 10 from the flow dividing valve 60; an oil passage 102, branching from a portion between the flow dividing valve 60 and the check valve 101 and connecting to the tank 90; and an on-off valve 103, provided in the oil passage 102. The on-off valve 103 has a spring 104, which is initially set with momentum corresponding to the unloaded condition starting pressure Pu. The on-off valve 103 is a two position switching valve which can be switched according to the magnitude of the operating oil pressure Pw by receiving the operating oil pressure Pw from the working machine hydraulic circuit 10 to oppose the momentum given to the spring 104. Specifically, when the operating oil pressure Pw is defined by "Pw≦Pu", the on-off valve 103 cuts off the oil passage 102 and supplies the oil quantity Qs from the flow dividing valve 60 to the working machine hydraulic circuit 10 (non-unloaded condition). On the other hand, when the operating oil pressure Pw is defined by "Pmax≧Pw>Pu", the on-off valve 103 provides communication from the flow dividing valve 60 to the oil passage 102, and drains the oil quantity Qs into the tank 90 from the flow dividing valve 60 (unloaded condition). Irrespective of the magnitude of the operating oil pressure Pw, when a steering operation is effected at the minimum idling engine speed, the flow dividing valve 60 supplies the oil quantity Qs into the steering hydraulic circuit 20.

The operation of the aforesaid conventional art will be explained with reference to FIGS. 19A, 19B, 19C, and 20. In order to make the explanation easier, it is assumed that the oil flow Qs flows to the working machine hydraulic circuit 10 side and that the reduction ratio from the engine 70 to each of the hydraulic pumps 30, 40, and 50 is "1", unless otherwise specified.

In FIG. 19A, the operating oil pressure Pw is plotted in the axis of ordinates, and the displacement volume Vw of the working machine hydraulic pump 30 per one rotation of the engine 1 is plotted in the axis of abscissa. In FIG. 19B, the operating oil pressure Pw is plotted in the axis of ordinates, and the displacement volume Vs of the auxiliary hydraulic pump 50 per one rotation of the engine 1 is plotted in the axis of abscissa. In FIG. 19C, the steering oil pressure Pst is plotted in the axis of ordinates, and the displacement volume Vst of the steering hydraulic pump 40 per one rotation of the engine 1 is plotted in the axis of abscissa. The relief pressures of the circuits 10 and 20 are not necessarily the same, but in the present embodiment both of them have the same pressure Pmax.

FIG. 19A shows the oil pressure torque Tw (=Pw*Vw) of the working machine hydraulic pump 30 per one rotation of the engine 70. FIG. 19B shows the oil pressure torque Ts (=Pw*Vs) of the auxiliary hydraulic pump 50 per one rotation of the engine 70. The oil pressure torque Tws (not illustrated) is the total of the oil pressure torque Tw and the oil pressure torque Ts, i.e., "Tws=Tw+Ts". This can be also considered as "Tws=Pw*(Vw+Vs)" in a non-unloaded condition (Pw≦Pu). The maximum value of the oil pressure torque Tws in a non-unloaded condition occurs at the time when "Pw=Pu" ("hatched portions shown by the diagonal lines extending upwardly to the right in FIGS. 19A and 19B). On the other hand, in an unloaded condition (Pmax≧Pw>Pu), the oil flow Qs discharged from the auxiliary hydraulic pump 50 is drained into the tank 90 by means of the unload circuit 100; therefore, "Ts=0" holds good. Accordingly, the oil pressure torque Tws is defined by "Tws=Tw", specifically, "Tws=Pw*Vw". The maximum value of the oil pressure torque Tws in an unloaded condition occurs at the time of "Pw=Pmax" ("hatched portions shown by the diagonal lines extending upwardly to the left in FIG. 19A). On the other hand, the oil pressure torque Tst of the steering hydraulic pump 40 per one rotation of the engine 70 is defined by "Tst=Pst*Vst".

In FIG. 20 the engine torque Te is plotted in the axis of ordinates while the engine speed Ne is plotted in the axis of abscissa. FIG. 20 shows the total amount of the oil pressure torque (Tw+Ts+Tst=Tws+Tst) relative to the engine torque Te, an area of excess torque ΔT1 relative to the engine torque of the vehicle, and distribution examples of the excess torque ΔT1 and traveling torque Ttr.

The disadvantages of the aforesaid conventional art are as follows.

(1) During operation with a high load, there is a disadvantage of reducing the operational efficiency due to waiting time occurring, since the working machine hydraulic circuit 10 does not receive the oil flow Qs from the flow dividing valve 60, although a little higher flow rate of oil would speed up the operation. The operation with a high load, e.g., excavating rock or the like with a bucket, corresponds to an unloaded condition (Pmax≧Pw>Pu).

(2) The actual operation of the vehicle is mainly an operation with a low load, such as raising the boom with a load in a bucket. The actual operation has an extremely high percentage of non-unloaded condition (Pw≦Pu). Therefore, in order to increase the operational speed in the non-unloaded condition and further to reduce relief loss of the oil pressure at the time of "Pw=Pmax" in an unloaded condition, the vehicle is normally designed to have "(Pu*(Vw+Vs))>(Pmax*Vw)". In order to efficiently use the engine torque Te, the volume of the bucket, the inner diameter of each of the hydraulic cylinders 11 and 12, and the like, of the vehicle are designed so that a condition close to "Tws=(Pu*(Vw+Vs))", (specifically, a condition close to "Pw=Pu") becomes normal. Further in the actual operation, there are a great many occasions in which the traveling and steering operations are carried out at the same time. Accordingly, as FIG. 20 shows, the excess torque ΔT1 (=Te−(Tw+Ts+Tst+Ttr)) becomes smaller. In addition, as for the vehicle, switching operations between traveling forwardly and traveling rearwardly are frequently carried out in the normal condition. In this situation, an operator lets up on the accelerator pedal to reduce the engine speed Ne, and presses downwardly on the accelerator pedal to increase the engine speed Ne, directly after switching to traveling forwardly or traveling rearwardly. However, the excess torque ΔT1 is small; therefore, the accelerating performance of the engine speed Ne is worse, and the resulting disadvantages include that the engine 70 produces black smoke, the fuel consumption efficiency becomes worse, and the like occur. The realities are that, since the excess torque ΔT1 is secured in the limited engine torque Te, it cannot be made indiscriminately great.

(3) Further, in the aforesaid (2), when the operator lets up on the accelerator pedal to reduce the speed of the engine 70 to the minimum idling engine speed and a steering operation is conducted, the oil flow Qs, discharged from the auxiliary hydraulic pump 50, is switched and flows to the steering hydraulic circuit 20 via the flow dividing valve 60 instead of to the working machine hydraulic circuit 10. Accordingly, the speed of the working machine is reduced, but the steering speed becomes higher. In such an operation, it is preferable that the steering speed be low in order to prevent a load from falling from the bucket. However, as described above, the oil flow Qs is supplied to the steering hydraulic circuit 20 by the flow dividing valve 60 so that a sufficient quantity of oil is secured in the steering hydraulic circuit 20. For this reason, the operator tends to increase the steering speed, and a load tends to fall off the bucket. On the other hand, if the operator controls the steering speed to prevent the load from falling off, the oil discharge Qs from the auxiliary hydraulic pump 50 becomes excessive in the steering hydraulic circuit 20. The excess quantity of oil is diverted to the working machine hydraulic circuit 10 by way of an oil pressure torque lost portion, such as an orifice provided in the flow dividing valve 60. Specifically, a load is prevented from falling off, but oil pressure torque is lost. It is natural that the excess torque ΔT1 is not increased.

There is a known art in which the engine power of a working vehicle is used for traveling by the medium of a torque converter, and is used for driving a working machine by the medium of a working machine pump. FIG. 21 shows an example of the engine torque characteristics of the working vehicle; the engine speed N is plotted in the axis of abscissa; and the engine torque T is plotted in the axis of ordinates. With an engine output torque Ta, the absorption torque (tractive torque) Tb of a torque converter becomes the tractive torque of the vehicle by the medium of the torque converter. In such a working vehicle, a working machine pump is generally a fixed displacement type. According to a first conventional art, when the load becomes heavier, as a result of an increase in the working machine torque Tc (proportional to the product of the load pressure P and the pump capacity V of the working machine pump), the acceleration torque Td, which is the result of subtracting the tractive torque Tb and the working machine torque Tc from the engine output torque Ta, is decreased. In contrast to the first conventional art, a second conventional art, which increases the acceleration performance at lower engine speeds, is known. According to the second conventional art, the working machine torque Tc1 is reduced more as the engine speed becomes lower (the reduction quantity is shown by the diagonal hatching lines in FIG. 21); and the acceleration torque Td1, which is the result of subtracting the tractive torque Tb1 and the working machine torque Tc1 from the engine output torque Ta, is increased.

According to the second conventional art, shown in FIG. 22, a working machine pump 202, driven by an engine 201, is connected to a tank by way of a bleed-off conduit 214 when an operation valve 203 is in its center valve position. When the operation valve 203 is in its operational position a or b, the working machine pump 202 is connected to a working machine actuator (for example, a hydraulic cylinder) 204a via supply conduits 215. A working machine pump capacity control means 205 has: a capacity control valve 205c, having a pilot pressure receiving portion 205f; a capacity control cylinder 205d; and a capacity control spring 205e coupling these components. The working machine load pressure P, outputted by the working machine hydraulic pump 202, is applied to the capacity control valve 205c and to a rod side of the capacity control cylinder 205d via an original pilot pressure conduit 221. In an engine speed detecting means 207, when the speed N of the engine 201 is reduced, the flow discharged from a fixed displacement pump 207a is reduced; therefore, the upstream pressure of an orifice 207b is reduced, and a pilot pressure control valve 207d is switched to its position b. For this reason, the pilot pressure, which is inputted to the pilot pressure receiving portion 205f of the capacity control valve 205c, is increased so as to be close to the pilot original pressure which is controlled at a fixed pressure by the relief valve 207c. Specifically, as the engine speed N is decreased, the working machine pump capacity VL is reduced.

However, the second conventional art has the following disadvantages.

(1) Irrespective of the magnitude of the load pressure P of the working machine pump 202, as the speed of the engine 201 is lowered, the working machine pump capacity VL (cc/rev) is decreased. For this reason, with a light load, as in raising a bucket without a load, there is a disadvantage in that the speed of the working machine is decreased and the working efficiency is reduced, although the working machine pump capacity V has a surplus by the degree that the load pressure P is reduced due to the working machine torque Tc1 being the same.

(2) When the center bypass bleed off type operational valve 203, illustrated in FIG. 22, is operated to its operational position a or b from its center valve position c and a supply conduit 215 to the hydraulic cylinder 204a is opened by closing the bleed-off conduit 214, the discharge Q ($CM^3$/min) from the working machine pump 202 is smaller at a lower engine speed. For this reason, it is difficult to increase the oil pressure of the supply conduit 215 to the hydraulic cylinder 204a, and there is a disadvantage of increasing a dead zone of an operational lever until the working machine starts to move, thereby worsening operability.

SUMMARY OF THE INVENTION

Mitigating the disadvantages of the aforesaid conventional art, a first object of the present invention is to provide a hydraulic circuit for a loader vehicle which can supply the most suitable quantity of oil to a working machine hydraulic circuit in an unloaded condition. A second object is to provide a hydraulic circuit for a loader vehicle, which can secure the necessary oil pressure torque without changing the engine torque, thereby increasing the excess torque. Further, a third object is to provide a pump capacity control device for a working vehicle which increases the excess torque of an engine in such a way as to obtain the desired pump capacity in accordance with the working conditions depending on the engine speed, the working machine load pressure, or the like, to increase the excess torque of the engine and to improve the working efficiency and the working machine operability.

In order to attain the aforesaid first object, a first configuration of a hydraulic circuit for a loader vehicle according to the present invention includes: a working machine hydraulic circuit, for conducting a hydraulic drive of a working machine by receiving oil discharged from a working machine hydraulic pump; a steering hydraulic circuit, for conducting a hydraulic drive of a steering operation by receiving oil discharged from a steering hydraulic pump; a variable displacement auxiliary hydraulic pump in which, when the operating oil pressure Pw exceeds predetermined oil pressure Pu (Pw>Pu) by receiving the operating oil pressure Pw of the working machine hydraulic circuit, the displacement volume becomes smaller as the operating oil pressure Pw becomes higher; and a flow dividing valve, for switching and supplying oil discharged from the auxiliary hydraulic pump to either one of the hydraulic circuits, with a priority being given to the steering hydraulic circuit.

According to the first configuration, the following operational effects are obtained. In an unloaded condition (Pw>Pu), the conventional art drains into a tank the oil which is discharged from the auxiliary hydraulic pump. On the other hand, in the first configuration in accordance with the invention, the auxiliary hydraulic pump supplies the oil, discharged from the auxiliary hydraulic pump, to the working machine hydraulic circuit by changing the displacement volume in an unloaded condition (Pw>Pu). Accordingly, even in an unloaded condition, the working speed can be increased. Further, by changing the displacement volume of the auxiliary hydraulic pump, only the necessary quantity of oil discharge flow Qs is generated; therefore, the loss of oil pressure torque can be prevented.

A second configuration of a hydraulic circuit for a loader vehicle according to the present invention includes: a working machine hydraulic circuit, for conducting a hydraulic drive of a working machine by receiving oil discharged from a working machine hydraulic pump; a steering hydraulic circuit, for conducting a hydraulic drive of a steering operation by receiving oil discharged from a steering hydraulic pump; an electromagnetic variable displacement auxiliary hydraulic pump in which the displacement volume is free to vary responsive to an exciting current; an operating oil pressure detecting means, for detecting the operating oil pressure Pw of the working machine hydraulic circuit; a flow dividing valve, for switching and supplying oil discharged from an auxiliary hydraulic pump to either one of the hydraulic circuits, with a priority being given to the steering hydraulic circuit; and an exciting current generating means, for previously storing a predetermined oil pressure Pu, for generating the exciting current which makes the displacement volume smaller as the operating oil pressure Pw becomes higher, and for inputting the exciting current to the auxiliary hydraulic pump when the operating oil pressure Pw exceeds a predetermined oil pressure Pu (Pw>Pu) by receiving the operating oil pressure Pw from the operating oil pressure detecting means.

The second configuration is an example in which the first configuration is electrically embodied. Accordingly, it has the same operational effects as the first configuration.

In order to attain the second object, a third configuration of a hydraulic circuit for a loader vehicle according to the present invention includes: a working machine hydraulic circuit, for conducting a hydraulic drive of a working machine by receiving oil discharged from a working machine hydraulic pump; a steering hydraulic circuit, for conducting a hydraulic drive of a steering operation by receiving oil discharged from a steering hydraulic pump; a variable displacement auxiliary oil hydraulic pump, which separately has an operating oil pressure receiving surface area Aw for receiving operating oil pressure Pw of the working machine hydraulic circuit and a steering oil pressure receiving surface area Ast for receiving steering oil pressure Pst of the steering hydraulic circuit, with the relationship "Aw>Ast", and in which the displacement volume becomes smaller as the value of "(Pw*Aw)+(Pst*Ast)" exceeds a predetermined value; and a flow dividing valve, for switching and supplying oil discharged from the auxiliary hydraulic pump to either one of the hydraulic circuits, with a priority being given to the steering hydraulic circuit.

According to the third configuration, the following operational effects are obtained. This will be explained by a comparison with the first configuration. The conditions set for the comparison will be described first.

The element of "a steering oil pressure receiving surface area Ast for receiving steering oil pressure Pst" in the third configuration is not included in the first configuration, but the other elements are the same as in the first configuration. Therefore, it is necessary to set "a predetermined value" in the third configuration as "(Pu*Aw)" which is made by multiplying "Pu" in the first configuration by "Aw" in the third configuration (specifically, "a predetermined value= (Pu*Aw)") as the same condition in comparing the first and the third configurations. The condition in which the value of "((Pw*Aw)+(Pst*Ast))" exceeds a predetermined value in the third configuration (specifically ((Pw*Aw)+(Pst*Ast))>a predetermined value) indicates an unloaded condition. Accordingly, "(Pw*Aw)+(Pst*Ast)=a predetermined value", which is made by replacing the aforesaid greater-than sign with an equal sign, shows a starting point of the unloaded condition. Here, as described above, "a predetermined value=Pu*Aw" is valid; therefore, "(Pw*Aw)+(Pst*Ast)= (Pu*Aw)" holds good. This is the condition set for comparison.

(1) A situation in which the working machine is singly used (Pst=0; an assumption that internal resistance in the steering hydraulic circuit 20 does not exist) will be explained. "Pst=0" is valid; therefore, "((Pw*Aw)+ (Pst*Ast))=(Pu*Aw)" becomes "(Pw*Aw)=(Pu*Aw)". This means that "Pw=Pu", and the "Pw" is the unloaded condition starting pressure (hereinafter referred to as "unloaded condition starting pressure Puu") when the working machine is singly operated. The unloaded condition starting pressure Puu has the same value as the unloaded condition starting pressure Pu in the first configuration. Specifically, it can be found that in the third configuration, when the working machine is singly operated, the same function in the unloaded condition as in the first configuration is obtained.

(2) Next, a situation in which the steering is singly operated (Pw=0; an assumption that internal resistance in the working machine hydraulic circuit 10 does not exist) will be explained. "Pst=0" is valid; therefore, "((Pw*Aw)+ (Pst*Ast))=(Pu*Aw)" becomes "(Pst*Ast) (Pu*Aw)". This is modified to "Pst=(Aw/Ast)Pu". The "Pst" is the unloaded condition starting pressure Puu (=(Aw/Ast)Pu) when the steering is singly operated. In the third configuration, the pressure receiving surface areas Aw and Ast have the relationship "Aw>Ast". Specifically, in the third embodiment, when the steering is singly operated, the unloaded condition starting pressure Puu becomes higher than the unloaded condition starting pressure Pu in the first configuration. For this reason, in the third configuration, if the steering is singly operated, the steering oil pressure Pst is controlled at a necessary and sufficient steering flow when it has higher pressure; therefore, a more comfortable steering operation can be carried out as compared with the conventional art as well as with the first configuration.

According to the aforesaid operation, flexibility in design is increased by constructing as follows. At first, the symbol "Pmax" is set as the relief oil pressure of the steering hydraulic circuit. Both of the pressure receiving surface areas Aw and Ast are set and constructed by adding the relationship "Aw/Ast>Pmax/Pu" to the aforesaid relationship "Aw>Ast". If constructed as above, the following effects are obtained.

Specifically, the aforesaid "Aw/Ast≧Pmax/Pu" can be modified to "(Aw/Ast)Pu≧Pmax". Here, the left side "(Aw/Ast)Pu" is the unloaded condition starting pressure Puu when the steering is singly operated in the third configuration as described above. Specifically, the unloaded starting pressure Puu is set at "Puu≧Pmax". However, the actual steering oil pressure Pst does not exceed the relief oil pressure Pmax. In other words, if set at "Puu≧Pmax", the auxiliary hydraulic pump maintains the maximum volume (specifically, a variable displacement auxiliary hydraulic pump becomes a fixed displacement type) irrespective of the magnitude of the steering oil pressure Pst during the single operation of steering, and a fast steering performance, as in the conventional art, can be attained.

(3) Next, a situation of the combined operations of working and steering ("Pst>0", and "Pw>0") will be explained. "Pst>0", and "Pw>0" are valid; therefore, "((Pw*Aw)+(Pst*Ast))=(Pu*Aw)" is as it is. Then this is modified to "Pw=(Pu*(Ast/Aw)Pst)". The "Pw" is the unloaded condition starting pressure Puu (=Pu*(Ast/Aw) Pst) during the combined operations of working and steering. The unloaded condition starting pressure Puu has a value which is lower than the unloaded condition starting pressure Pu in the first configuration by "(Ast/Aw)Pst" as is shown in the equation Puu=Pu–(Ast Aw)Pst. Accordingly, the following effects are obtained.

When the unloaded condition starting pressure Puu becomes lower, the oil flow discharged from the auxiliary hydraulic pump decreases by that degree, and the excess torque increases by that degree. However, the necessary oil flow is secured. During the combined operations of working and steering, for example, as described above, an accelerator pedal is returned to the minimum idling speed at the time of switching to traveling forwardly or traveling rearwardly, and according to the third configuration, excess torque at the minimum idling speed increases. Accordingly, when an operator presses down on the accelerator pedal after returning to the minimum idling speed, the acceleration performance of the engine speed is improved. As a result, an occurrence of black smoke in the engine or a reduction of the fuel consumption efficiency can be prevented. Further, at this time, as the volume of the auxiliary hydraulic pump becomes smaller, the steering speed does not increase. Specifically, a load in the bucket can be prevented from falling off. Naturally, excess oil does not flow into the steering hydraulic circuit; therefore, the loss of oil pressure torque can be prevented. Although the excess torque increases, the increased excess torque is obtained without generating unnecessary oil pressure torque as in the conventional art from the beginning. Accordingly, an unnecessary reduction of the engine speed can be prevented, and unnecessary variations in the engine speed can be prevented.

(4) According to the third configuration, the necessary oil pressure torque can be secured without changing the engine torque, thereby increasing excess torque.

A fourth configuration of a hydraulic circuit for a loader vehicle includes: a working machine hydraulic circuit, for conducting a hydraulic drive of a working machine by receiving pressurized oil discharged from a working machine hydraulic pump; a steering hydraulic circuit, for conducting a hydraulic drive of a steering operation by receiving pressurized oil discharged from a steering hydraulic pump; an electromagnetic variable displacement auxiliary hydraulic pump in which the displacement volume is free to vary responsive to an exciting current; an operating oil pressure detecting means, for detecting the operating oil pressure Pw of the working machine hydraulic circuit; a steering oil pressure detecting means, for detecting the steering oil pressure Pst of the steering hydraulic circuit; a flow dividing valve, for switching and supplying oil discharged from the auxiliary hydraulic pump to either one of the hydraulic circuits, with a priority being given to the steering hydraulic circuit; and an exciting current generating means, for previously storing the predetermined oil pressure Pu, for computing "(Pw+k*Pst)" (where k<1) by receiving the operating oil pressure Pw from the operating oil pressure detecting means and the steering oil pressure Pst from the steering oil pressure detecting means, for generating the exciting current which makes the displacement volume smaller as the value of "(Pw+k*Pst)" becomes greater if "(Pw+k*Pst)>Pu" holds good, and for inputting the exciting current into the auxiliary hydraulic pump.

The fourth configuration is an embodied example in which the structures of both of the pressure receiving surface areas Aw and Ast in the third configuration are replaced with electrical control. Specifically, if both sides of "((Pw*Aw)+(Pst*Ast))>(Pu*Aw)", which is obtained by "((Pw*Aw)+(Pst*Ast))>a predetermined value" and "a predetermined value=Pu*Aw" in the third configuration, is divided by "Aw", "(Pw+(Ast/Aw)Pst)>Pu" is obtained. Here, if "Ast/Aw=k" is assumed, "(Pw+k*Pst)>Pu" is valid, and the third configuration is established. Specifically, according to the fourth configuration, the same operational effects as in the third configuration are obtained.

In order to attain the aforesaid third object, a configuration of a pump capacity control device for a working vehicle according to the present invention includes: a working machine pump, driven by an engine and driving a working machine actuator; a working machine pump capacity control means, for controlling the working machine pump capacity which is the discharge quantity for one rotation of the working machine pump; a working machine load detecting means; and an engine speed detecting means; wherein the working machine pump capacity control means reduces the working machine pump capacity as the working machine load is increasing and as the engine speed is decreasing, based on each of the detection values of the working machine load detecting means and the engine speed detecting means.

According to the above described configuration of the pump capacity control device, as the engine speed is reduced to be lower, the working machine pump capacity is reduced; therefore, the working machine torque decreases and the engine acceleration torque increases. For this reason, the acceleration performance of the working vehicle in the lower engine speed area is improved. At the same time, as the working machine load is increased, the working machine pump capacity is reduced. Therefore, when the load is light, even at the same engine speed as with a heavier load, the working machine pump capacity is increased, thereby increasing the working machine speed and the working efficiency. In addition, when the load becomes lighter, the working machine pump capacity is increased in the lower engine speed area, the actuating pressure is raised faster even with a center-bypass bleed off type operation valve, and a dead zone up to a working machine actuating point is decreased, so that the operability is improved.

In order to attain the aforesaid third object, another configuration of a pump capacity control device for a working vehicle includes: a working machine pump, driven by an engine and driving a working machine actuator; a steering pump, driven by the engine and driving a steering actuator; a steering pump capacity control means, for controlling the steering pump capacity which is the discharge quantity for one rotation of the steering pump; a working machine load detecting means; an engine speed detecting means; and a steering priority valve for helpingly supplying part of the oil flow discharged from the steering pump to the working machine actuator when the steering pump discharge is not less than the necessary oil quantity for the steering actuator; wherein the steering pump capacity control means reduces the steering pump capacity as the working machine load is increasing and as the engine speed is decreasing, based on each of the detection values of the working machine load detecting means and the engine speed detecting means.

According to the latter configuration of the pump capacity control device, as the engine speed is reduced, the steering pump capacity is reduced; therefore, the working machine torque is reduced and the engine acceleration torque is increased. For this reason, the acceleration performance of the working vehicle in the lower engine speed area is improved. At the same time, as the working machine load is increased, the steering pump capacity is reduced. Therefore, when the load is lighter, even at the same engine speed as with a greater load, the steering pump capacity is increased. Accordingly, the assisting oil flow to the working machine actuator is increased; thereby, increasing the working machine speed to increase the operational efficiency. In addition, if the load becomes lighter, the steering pump capacity in the lower engine speed area is increased, therefore the actuating pressure is raised faster even with a center-bypass bleed off type operation valve, and the dead zone up to a working machine actuating point is decreased, so that the operability is improved.

Further, the steering pump capacity control means can control the steering pump capacity so that the steering pump discharge does not exceed a predetermined value even if the engine speed is further increased, when the working machine load detecting means detects that the working machine load pressure is not more than a predetermined value, and when the steering pump discharge per unit time reaches a predetermined value as a result of the engine speed being increased.

According to the latter configuration of the pump capacity control device, when it is determined that the working machine load pressure, which is detected by the working machine load detecting means, is not more than a predetermined value, and that the working machine is not driven, the control is carried out so that the steering pump discharge quantity per unit time does not exceed a predetermined value. Therefore, only the steering pump discharge which is necessary for the steering actuator is obtained, and needless power at higher engine speed can be reduced.

BRIEF DESCRIPTION OF THE DRAWINGS

FIG. 1 is a diagram of a hydraulic circuit for a first embodiment of a loader vehicle in accordance with the present invention.

FIGS. 2A to FIGS. 2C are graphs of the oil pressure torque of the first embodiment, with FIG. 2A showing the oil pressure torque of the working machine hydraulic pump, FIG. 2B showing the oil pressure torque of the auxiliary hydraulic pump, and FIG. 2C showing the oil pressure torque of the steering hydraulic pump.

FIGS. 4A to FIGS. 4C are graphs of the oil pressure torque during single operation of a working machine in the second embodiment, with FIG. 4A showing the oil pressure torque of the working machine hydraulic pump, FIG. 4B showing the oil pressure torque of the auxiliary hydraulic pump, and FIG. 4C showing the oil pressure torque of the steering hydraulic pump.

FIGS. 5A to FIGS. 5C are graphs of oil pressure torque in the second embodiment during single operation of steering, with FIG. 5A showing the oil pressure torque of the working machine hydraulic pump, FIG. 5B showing the oil pressure torque of the auxiliary hydraulic pump, and FIG. 5C showing the oil pressure torque of the steering hydraulic pump.

FIGS. 6A to FIGS. 6C are graphs of the oil pressure torque in the second embodiment during combined operations of working and steering, with FIG. 6A showing the oil pressure torque of the working machine hydraulic pump, FIG. 6B showing the oil pressure torque of the auxiliary hydraulic pump, and FIG. 6C showing the oil pressure torque of the steering hydraulic pump.

FIG. 12 is a graph showing the relationship between the engine speed and the working machine pump discharge quantity of the fifth embodiment.

FIG. 17 is a graph showing the discharge quantity from the steering pump in the sixth embodiment while the working machine is in operation.

BEST MODE FOR CARRYING OUT THE INVENTION

Preferred embodiments of the present invention will now be described in detail below with reference to the attached drawings.

The first through the fourth embodiments of the invention are shown in FIGS. 1–8. In order to facilitate the explanation, FIGS. 1–8 are made by using most of the parts of FIG. 18, with the same elements as those in FIGS. 18–20 being given the same numerals and symbols to omit the explanation thereof.

Figure 18:
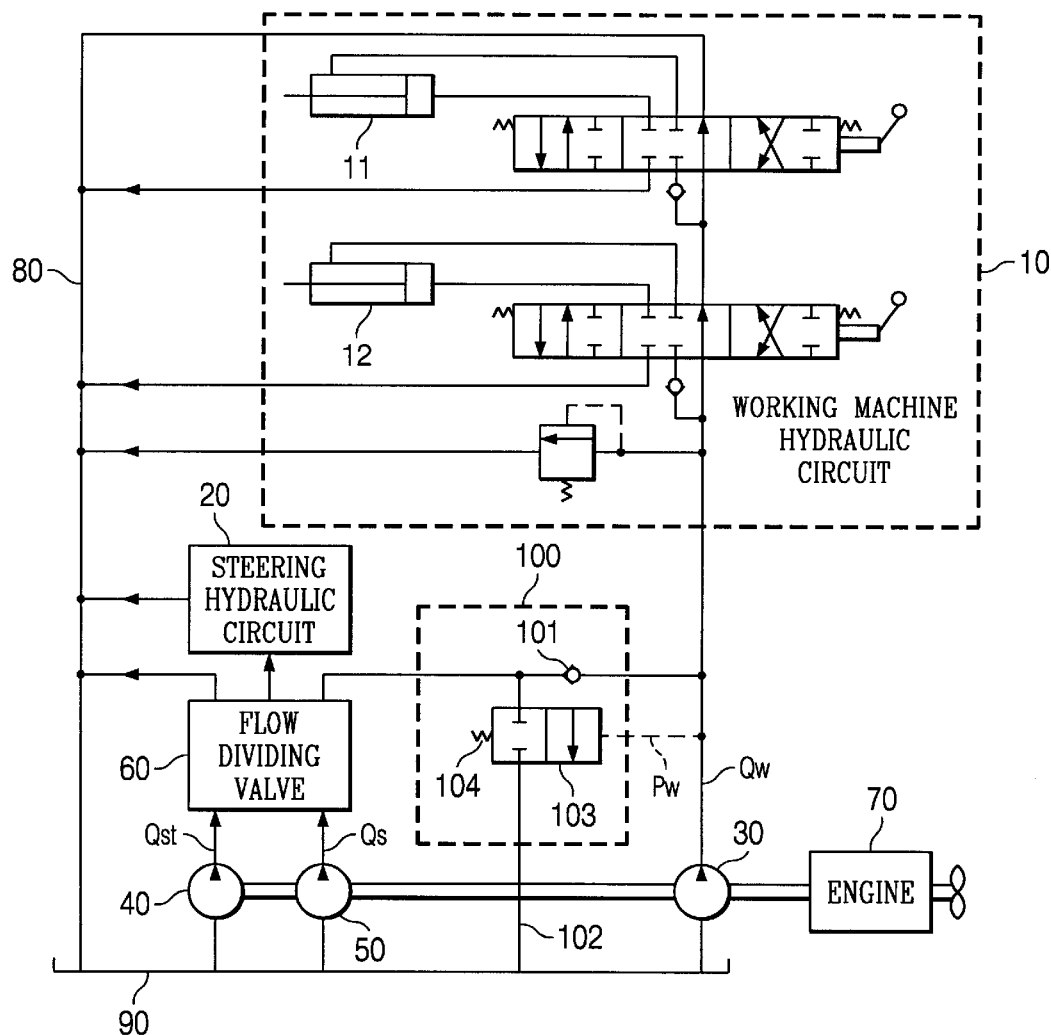
FIG. 18 is a diagram of a conventional hydraulic circuit for a loader vehicle.
Figure 19A:
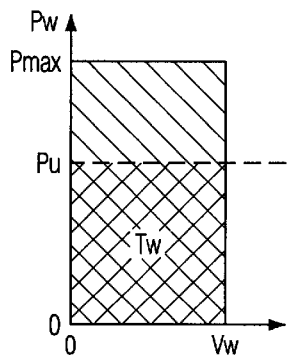
FIGS. 19A to FIGS. 19C are graphs of the oil pressure torque of the hydraulic circuit in FIG. 18, with FIG. 19A showing the oil pressure torque of the working machine hydraulic pump, FIG. 19B showing the oil pressure torque of the auxiliary hydraulic pump, and FIG. 19C showing the oil pressure torque of the steering hydraulic pump.
Figure 19B:
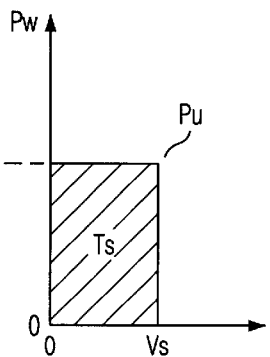
Figure 19C:
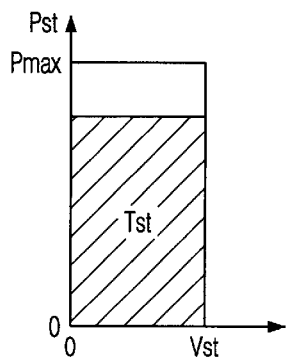
Figure 20:
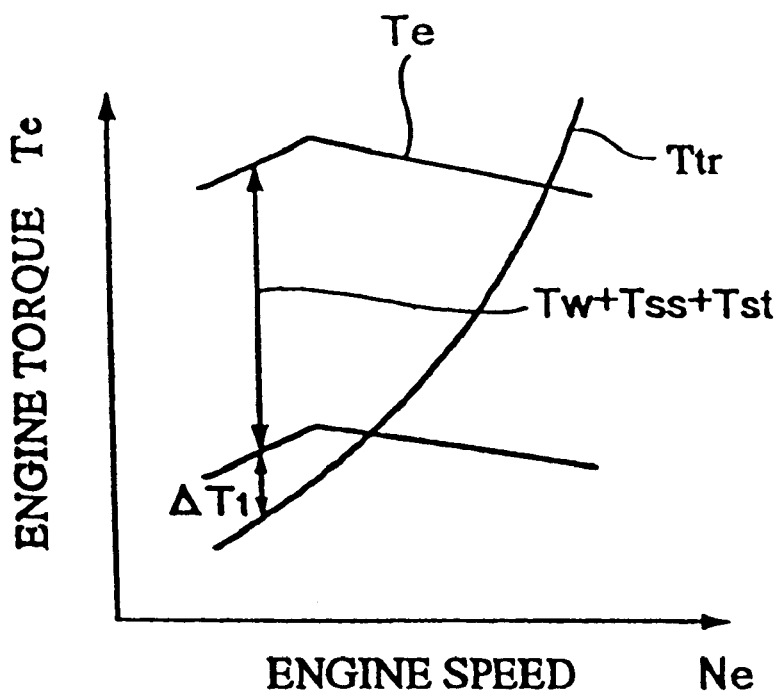
FIG. 20 is a graph of the excess torque of the hydraulic circuit in FIG. 18.

The first embodiment will be explained with reference to FIG. 1 and FIGS. 2A through 2C. FIG. 1 corresponds to FIG. 18, while FIGS. 2A through 2C correspond to FIGS. 19A through 19C, respectively. FIG. 1 is different from FIG. 18 in that the auxiliary hydraulic pump 50A in FIG. 1 is a variable displacement type while the auxiliary hydraulic pump 50 in FIG. 18 is a fixed displacement type. Accordingly, the inventions in FIG. 2B and FIG. 19B have different operational effects. FIGS. 2A and 19A, and FIGS. 2C and 19C, respectively, have the same operational effects although what is shown in each of these drawings is different from the corresponding drawing. Further, the relief oil pressures Pmax in the hydraulic circuits 10 and 20 are the same oil pressure. In order to facilitate the explanation, it is assumed that there is no internal resistance based on the flow of oil in either of the hydraulic circuits 10 and 20.

The first embodiment shown in FIG. 1 comprises: the working machine hydraulic circuit 10, for hydraulically driving a working machine with the oil flow Qw discharged from the working machine hydraulic pump 30; a steering hydraulic circuit 20, for hydraulically driving a steering operation with oil flow Qst discharged from the steering hydraulic pump 40; and the flow dividing valve 60, for supplying oil flow Qs discharged from the auxiliary hydraulic pump 50A to either the hydraulic circuit 10 or the hydraulic circuit 20 by switching from/to the hydraulic circuit 10 and to/from the hydraulic circuit 20, with the priority being given to the steering hydraulic circuit 20. The hydraulic pumps 30, 40, and 50A are rotationally driven by the engine 70. Each of the hydraulic circuits 10 and 20 and the flow dividing valve 60 is connected to a drain circuit 80 for draining unused oil from the steering hydraulic pump 40 into a tank 90.

The auxiliary hydraulic pump 50A is a variable displacement type, as described above; therefore, it has a servo cylinder 51 and a control valve 52A. The servo cylinder 51 has a first spring 51a in a rod side chamber (the left side chamber shown in the drawing), and receives the operating oil pressure Pw. When the first spring 51a is stretched to its full length (specifically, when the servo cylinder 51 is shrunk to its minimum length), the displacement volume Vs of the auxiliary hydraulic pump 50A is at the maximum. On the other hand, a bottom side chamber (the right side chamber shown in the drawing) is designed in such a way that the operating oil pressure Pw comes and goes freely. The control valve 52A is a pilot oil pressure type of two-position changeover valve having a first position portion (the left side in the drawing) and a second position portion (the right side in the drawing). The first position portion of the control valve 52A receives the operating oil pressure Pw on the pressure receiving surface at its outer end, and has a port for introducing the operating oil pressure Pw into the bottom side chamber of the servo cylinder 51. The second position portion (the right side in the drawing) of the control valve 52A has a second spring 52a at its outer end surface and a port for providing communication between the bottom side chamber of the servo cylinder 51 and the tank 90. The other end of the second spring 52a is directly connected to the rod of the servo cylinder 51, and is initially set to be shrunk when the operating oil pressure Pw exceeds the predetermined oil pressure Pu. The operation of the auxiliary hydraulic pump 50A with the above configuration is as follows.

When the operating oil pressure Pw is defined by "Pw≦Pu", the momentum given to the second spring 52a overcomes the oil pressure force caused by the operating oil pressure Pw on the end of the valve 52A which is opposite from the spring 52A, and moves the control valve 52A to its second position. Accordingly, the bottom side chamber of the servo cylinder 51 communicates with the tank 90 through the second position portion, and then the operating oil pressure Pw entering the rod side chamber of the servo cylinder 51, in collaboration with the first spring 51a, shrinks the servo cylinder 51. Thereby, the displacement volume Vs of the auxiliary hydraulic pump 50A reaches the maximum (specifically, the non-unloaded condition).

On the other hand, when the operating oil pressure Pw rises to "Pw>Pu", the operating oil pressure Pw causes the second spring 52a to shrink to switch the control valve 52A from its second position to its first position. The operating oil pressure Pw then flows into the bottom side chamber of the servo cylinder 51 through the first position portion. The pressure receiving surface area of the rod side chamber of the servo cylinder 51 is smaller than the pressure receiving surface area of the bottom side chamber. Consequently, the oil pressure force in the bottom side chamber causes the servo cylinder 51 to extend until the oil pressure force is balanced against the resultant force of the oil pressure force in the head side chamber and the spring force of the first spring 51a, thereby reducing the displacement volume Vs of the auxiliary hydraulic pump 50A. When the servo cylinder 51 extends to cause the spring force of the second spring 52a to increase such that the spring force overcomes the oil pressure force provided by the operating oil pressure Pw on the outer end of the first position portion, the control valve 52A returns to its second position. Following the return, the oil in the bottom side chamber of the servo cylinder 51 flows into the tank 90. Even if a small quantity of oil goes into the tank 90, the oil pressure force provided by the operating oil pressure Pw on the outer end of the first position portion becomes greater than the spring force of the second spring 52a once again, thereby returning the control valve 52A from its second position to its first position. That is to say, the control valve 52A conducts a shuttle movement between its first and second positions to keep the forces in equilibrium. Specifically, in "Pmax≧Pw>Pu", the displacement volume Vs of the auxiliary hydraulic pump 51A (specifically, the oil flow Qs) increases and decreases in proportion to the operating oil pressure Pw (specifically, unloaded condition) based on a spring constant of the first spring 51a as shown by the diagonal line La in FIG. 2B. The displacement volume Vs is at the minimum at the time of "Pw=Pmax", and in the present embodiment, "Vs=0" is established. It should be noted that "Vs=0" is not established for the maintenance of the hydraulic circuit; rather "Vs=0" is established to facilitate the explanation.

Specifically, the first embodiment includes the variable displacement auxiliary hydraulic pump 50A, with the displacement volume Vs decreasing as the operating oil pressure Pw becomes higher when the operating oil pressure Pw exceeds the predetermined oil pressure Pu by receiving the operating oil pressure Pw of the working machine hydraulic circuit 10 (Pw>Pu).

According to the first embodiment, during an operation with a high load (for example, during an unloaded condition in which excavating rocks with a bucket or the like is carried out, and Pmax≧Pw>Pu), a little larger quantity of oil (the hatched portion in FIG. 2B) for each revolution of the auxiliary pump 50A is provided into the working machine hydraulic circuit 10, which cannot be attained in the prior art, and the operating speed is increased. That is to say, the most suitable flow rate of oil can be added to the working machine hydraulic circuit 10 during an unloaded condition. In addition, by changing the displacement volume Vs of the auxiliary oil hydraulic pump 50A, only the necessary quantity of oil discharge Qs is designed to be produced; therefore, the loss of the oil hydraulic torque can be prevented.

Figure 3:
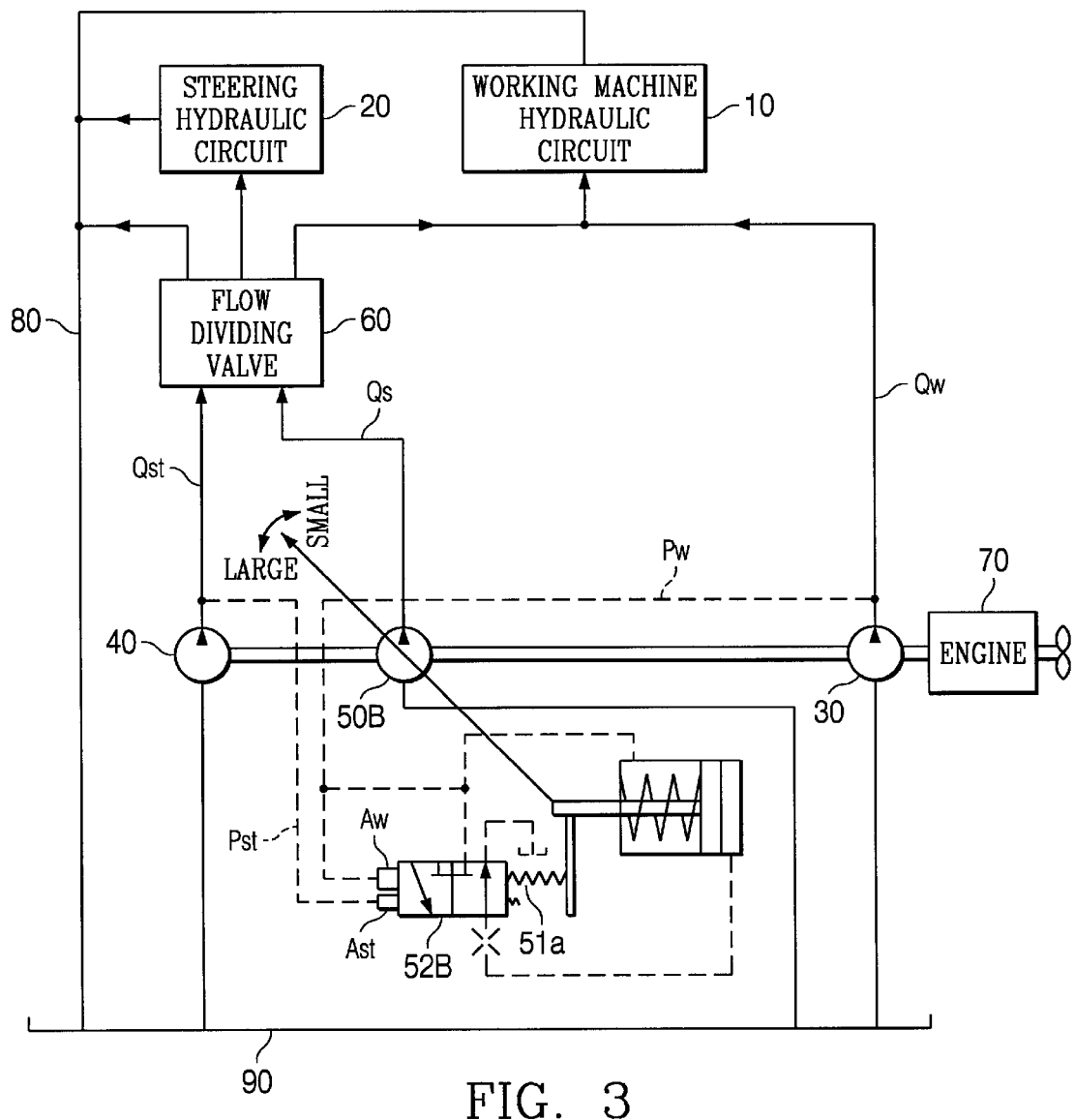
FIG. 3 is a diagram of a hydraulic circuit for a second embodiment of a loader vehicle in accordance with the present invention.

A second embodiment will be explained with reference to FIGS. 3–7. FIG. 3 is different from FIG. 1 with regard to the pressure receiving surfaces of the control valves, although both of them show variable displacement auxiliary hydraulic pumps. Consequently, only the differences will be described in detail.

The control valve 52B of the auxiliary hydraulic pump 50B has a different pressure receiving surface at the outer end of its first position portion as shown in FIG. 3, compared with the control valve 52A of the first embodiment. The pressure receiving surface at the outer end of the first position portion has an operating oil pressure receiving surface area Aw for receiving the operating oil pressure Pw and a steering oil pressure receiving surface area Ast for receiving the operating oil pressure Pst of the steering hydraulic circuit 20 independently of each other. It should be noted that the relationship between the pressure receiving surface areas Aw and Ast is set as "Aw>Ast". On the other hand, the second spring 52a at the outer end of the second position portion has an initial set spring force corresponding to "Pu*Aw" as in the first embodiment.

The unload starting pressure Puu in the second embodiment can be derived from the following equation 1. The left side of the equation 1 expresses the sum of the oil pressure force (the first term) based on the operating oil pressure Pw on the operating oil pressure receiving surface area Aw and the oil pressure force (the second term) based on the steering oil pressure Pst on the steering oil pressure receiving surface area Ast, while the right side expresses the initial set spring force (=Pu*Aw) of the second spring 52a. Equations 2 and 3, described in order following the equation 1, are conditional modified equations of equation 1, and equation 4 is simply a modified equation of equation 1.

$(Pw*Aw)+(Pst*Ast)=(Pu*Aw)$            Equation 1:

$Pw=Pu$ (in equation 1, $Pst=0$)            Equation 2:

$Pst=(Aw/Ast)Pu$ (in equation 1, $Pw=0$)            Equation 3:

$Pw=Pu-(Ast/Aw)Pst$.            Equation 4:

The explanation will be made below with reference to FIG. 4A through FIG. 7.

The aforesaid equation 2 (Pw=Pu, Pst=0, and an assumption that the internal resistance in the steering hydraulic circuit 20 does not exist) shows a situation in which only the working machine is operated. The oil pressure torque in this situation is shown in FIG. 4A through FIG. 4C. Specifically, the steering oil pressure torque Tst is zero (Tst=0) as shown in FIG. 4C. As is obvious from equation 2, when the operating oil pressure Pw is defined by "Pw=Pu", the unload starting pressure Puu is established. The unload starting pressure Puu equals the unload starting pressure Pu in the first embodiment (Puu=Pu). For this reason, the operational effects are the same, although the illustration in FIG. 4A is different from that in FIG. 2A. Likewise, FIG. 4B has an operational effect equal to that in FIG. 2B. Specifically, when only the working machine is operated by itself in the second embodiment, the same unload function as in the first embodiment is obtained.

The aforesaid equation 3 (Pst=(Aw/Ast)Pu, Pw=0, and an assumption that the internal resistance in the operating machine hydraulic circuit 10 does not exist) shows a situation in which only the steering is operated. The oil pressure torque in this situation is shown in FIG. 5A. Specifically, the operating oil pressure torque Tw is zero (Tw=0) as shown in FIG. 5A. However, with regard to the oil pressure torques Ts and Tst in this situation, the following operational effects are obtained.

As described in the above, both of the pressure receiving surface areas Aw and Ast have the relationship "Aw>Ast". Consequently, according to the equation 3, "Pst>Pu" is obtained. Specifically, when the steering oil pressure Pst is defined by "Pma>Pst>Pu", the unload occurs. In other words, the unload starting pressure Puu, which is higher than the unload starting pressure Pu in the first embodiment, can be obtained (Puu>Pu). Further, the following effect is also derived.

The actual steering oil pressure Pst never exceeds the relief oil pressure Pmax of the steering hydraulic circuit 20. However, there is no problem in setting the steering oil pressure Pst as the unload starting pressure Puu at more than the relief oil pressure Pmax, i.e., Puu>Pmax. Specifically, in "Puu=(Aw/Ast)Pu", there is no problem in setting "(Aw/Ast)Pu≧Pmax". Then both of the pressure receiving surface areas Aw and Ast are set by adding the relationship "Aw/Ast≧Pmax/Pu" to the relationship "Aw>Ast". In doing so, "Puu>Pmax" is valid, no matter how the steering oil pressure Pst may be changed; therefore, the volume Vs of the auxiliary hydraulic pump 50 is maintained to be the maximum volume. Accordingly, as shown in FIG. 5B, the variable displacement auxiliary hydraulic pump 50B can be operated as if it were a fixed displacement type. Specifically, during the sole operation of steering, the maximum oil discharge Qs of the auxiliary hydraulic pump 50 B can be utilized, and a fast steering operation can be attained.

Equation 4 (Pw=Pu−(Ast/Aw)Pst) shows the situation of the composite operation of working and steering. The oil pressure torque in this situation is shown in FIGS. 6A through 6C. The operating oil pressure torque Tw is shown in FIG. 6A, and the steering oil pressure torque Tst is shown in FIG. 6C. The oil pressure torque Ts of the auxiliary hydraulic pump 50B is changed according to the unload starting pressure Puu. Specifically, as shown in equation 4, when the operating oil pressure Pw equals "Pu (Ast/Aw)Pst", the unload starting pressure Puu is established (Puu=Pu−(Ast/Aw)Pst). In this situation, as shown in FIG. 6B and the relationship "Puu=Pu−(Ast/Aw)Pst", the value of the unload starting pressure Pu, being a fixed value in the first embodiment from which "(Ast/Aw)Pst" is subtracted, is the unload starting pressure Puu. The spring constant of the spring 52a remains the same as in the first embodiment; therefore, the displacement volume Vs of the auxiliary hydraulic pump 50B (specifically, the oil discharge Qs) is as shown in FIG. 6B. Specifically, when the operating oil pressure Pw is defined by "Pw<Puu", the displacement volume Vs maintains the maximum value; and when the operating oil pressure Pw is defined by "(Pmax−(Ast/Aw)Pst)≧Pw>Puu", it increases and decreases in proportion to the operating oil pressure Pw as shown by a diagonal line Lb based on the spring constant of the spring 52a. When the operating oil pressure Pw is defined by "Pmax≧Pw>(Pmax−(Ast/Aw)Pst)", the displacement volume Vs is at its minimum (in this embodiment, "Vs=0"). The first and the second embodiments have the same spring constant for the spring 52a; therefore, the gradient of the diagonal line Lb is the same as the gradient of the diagonal line La in the first embodiment.

Figure 7:
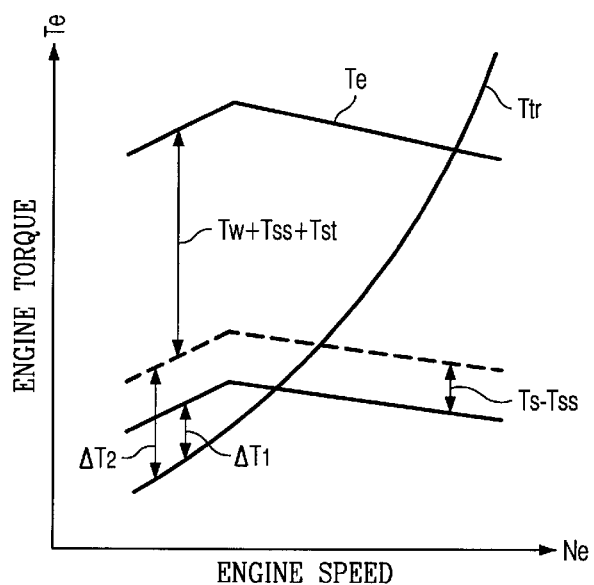
FIG. 7 is a graph of excess torque in the loader vehicle of the second embodiment.

In the second embodiment, when the working machine and the steering are concurrently operated, the following operational effects are obtained. The unload starting pressure Puu becomes lower than the unload pressure Pu by the value of "(Ast/Aw)Pst" during the sole operation of the working machine shown in FIGS. 2B and 4B. Accordingly, as shown in FIG. 7, the excess torque ΔT2 (=Te−(Tw+Tss+Tst+Ttr)) is made greater than the excess torque ΔT1 (=Te−(Tw+Ts+Tst+Ttr)) in FIGS. 2B and 4B by the quantity of "Ts−Tss". Specifically, when an operator presses down on the accelerator pedal to increase and return engine speed Ne at the minimum idling engine speed, an excellent increase in the acceleration of the engine speed Ne is obtained due to the greater excess torque ΔT2. Accordingly, an occurrence of black smoke in the engine 70 is prevented, and a deterioration in the rate of fuel consumption is improved. In this situation, the volume Vss (see FIG. 6B) of the auxiliary hydraulic pump 50B becomes smaller; therefore, the steering speed does not become higher, with the result that a load on the bucket is prevented from dropping therefrom. As a natural result, excess oil does not flow into the steering hydraulic circuit 20; therefore, the loss of oil pressure torque can be prevented. If these aforesaid operational effects are put another way, the reduction of the engine speed Ne can be controlled as shown in FIG. 7, thereby preventing a great variation in the engine speed Ne.

A third embodiment will be explained with reference to FIG. 8. The third embodiment is configured by adding electrical elements to the second embodiment which is illustrated in FIG. 3.

The third embodiment includes: the variable displacement auxiliary hydraulic pump 50C; the controller (exciting current generation means) 110, comprising a microcomputer and the like; a power source 120; an oil pressure gauge P1, for detecting the operating oil pressure Pw of the working machine hydraulic circuit 10 and for inputting the same into the controller 110; and an oil pressure gauge P2, for detecting the steering oil pressure Pst of the steering hydraulic circuit 20 and for inputting the same into the controller 110.

An electrical servo mechanism 53 of the auxiliary hydraulic pump 50C has an amplifier 53a, which is connected to the power source 120, and a solenoid 53b for receiving the output from the amplifier 53a. Exciting current I from the controller 110 is inputted to the amplifier 53a to be amplified, and the amplified exciting current operates the solenoid 53b, thereby changing the displacement volume Vs of the auxiliary hydraulic pump 50C. In this embodiment, when there is no exciting current I, the displacement volume Vs is at the maximum, and the displacement volume is designed to be decreased in inverse proportion to the exciting current I . When the exciting current I is not less than a predetermined value, the displacement volume Vs becomes the minimum. In the present embodiment, as described above, "Vs=0" is taken to facilitate the explanation.

The controller 110, generating the exciting current I, has previously memorized the unload starting pressure Pu of the first embodiment. The controller 110 receives the operating oil pressure Pw from the operating oil pressure detecting means P1, and receives the steering hydraulic pressure Pst from the steering oil pressure detecting means P2. The controller 110 then computes "Pw+k*Pst" (where k<1); and, if "(Pw+k*Pst)>Pu", generates the exciting current I which decreases the displacement volume Vs as the value of "(Pw+k*Pst)" increases, and inputs the same into the auxiliary hydraulic pump 50C. The unload starting pressure Puu at this time is given as "Pw" when "(Pw+k*Pst)>Pu" is made to be "(Pw+k*Pst)=Pu", which is further modified to "Pw=(Pu−k*Pst)". This unload starting pressure Puu (=Pu−k*Pst) corresponds to the unload starting pressure Puu (=Pu−(Ast/Aw)Pst) during combined operations of the working machine and the steering in the second embodiment. Specifically, the third embodiment is an embodiment in which the structure of both of the pressure receiving areas Aw and Ast in the second embodiment is replaced by an electrical control, and provides the same operational effects as in the second embodiment.

Figure 8:
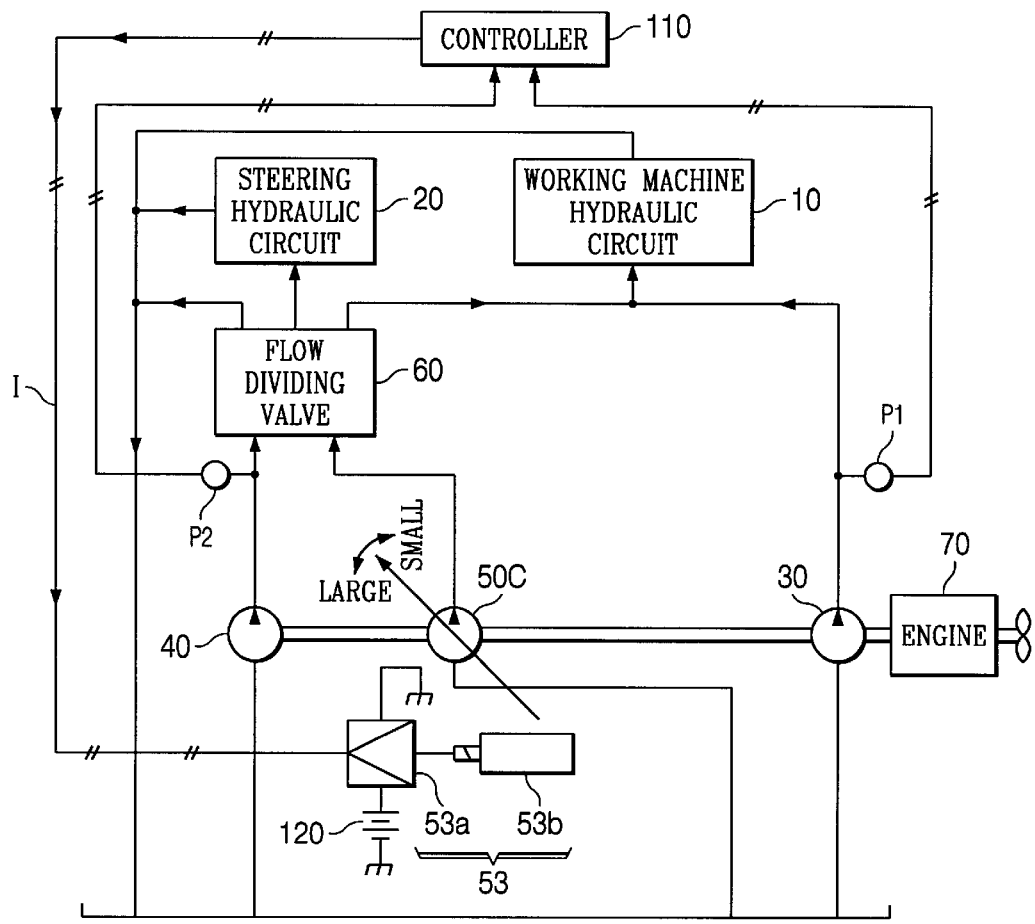
FIG. 8 shows a hydraulic circuit for third and fourth embodiments of a loader vehicle in accordance with the present invention.

A fourth embodiment will be explained by using FIG. 8 showing the third embodiment. In the fourth embodiment, the oil pressure gauge P2 is eliminated from FIG. 8. The controller 110 is designed to generate the exciting current I, which makes the displacement volume Vs smaller as the operating oil pressure Pw becomes higher when receiving the operating oil pressure Pw from the operating oil pressure detecting means P1 with "Pw>Pu", and to input the same into the auxiliary hydraulic pump 50C. The fourth embodiment is the first embodiment which is electrically attained, and provides the operational effects which are explained with reference to FIG. 2A to FIG. 2C in the first embodiment.

Figure 9:
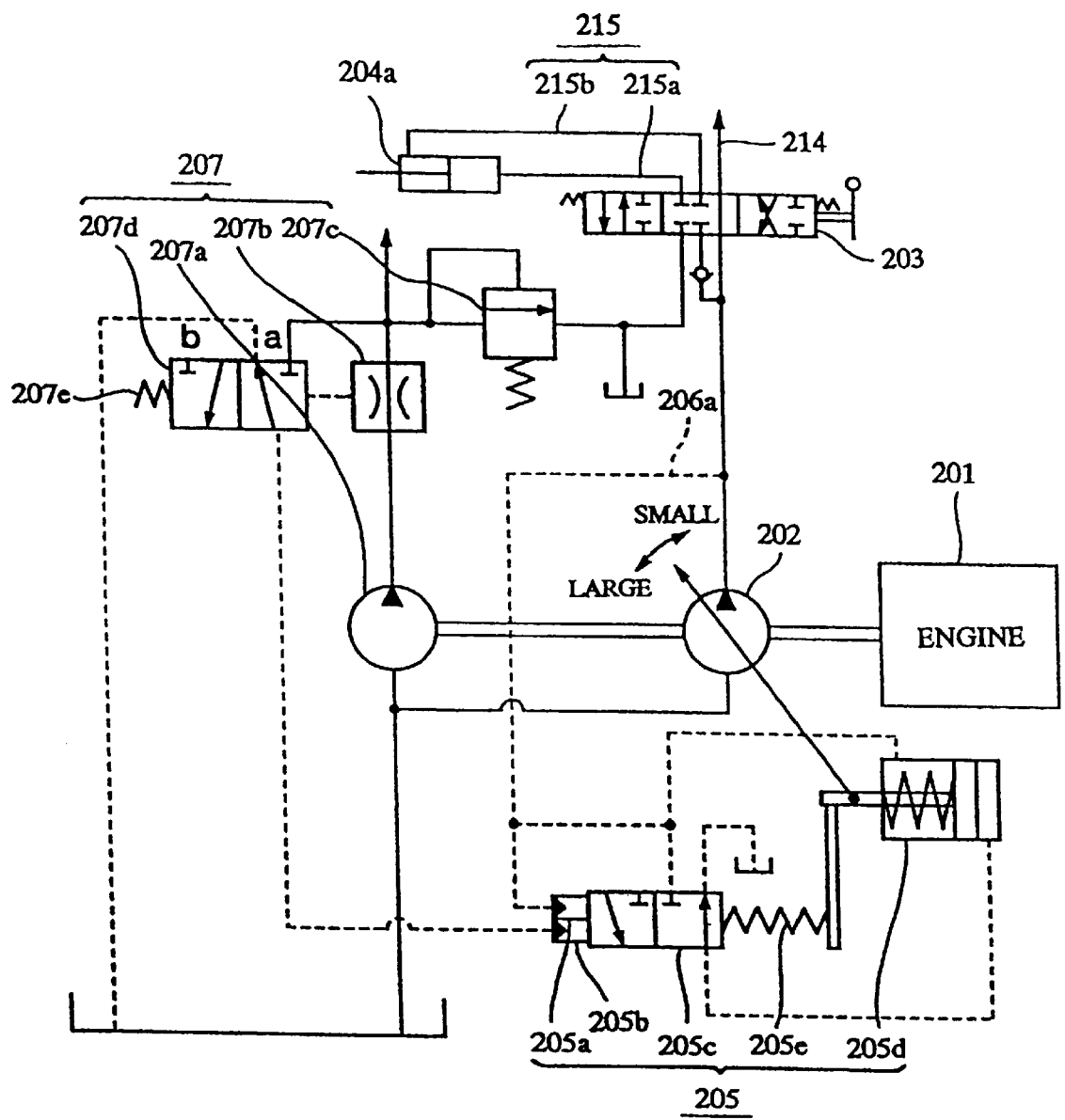
FIG. 9 is a diagram of a hydraulic circuit of a fifth embodiment of a loader vehicle according to the present invention.

The configuration of a fifth embodiment is shown in FIG. 9. A working machine pump 202, driven by an engine 201, is connected to a working machine actuator (in the present embodiment, a hydraulic cylinder) 204a through an operation valve 203. A working machine pump capacity control means 205 comprises: a capacity control valve 205c, having a first pilot pressure receiving portion 205a and a second pilot pressure receiving portion 205b; a capacity control cylinder 205d; and a capacity control spring 205e coupling these components. A working machine load pressure P signal, detected by a working machine load detecting means (in the present embodiment, a load pressure detecting conduit) 206a, is inputted to the first pilot pressure receiving portion 205a. The capacity control valve 205c is designed to reduce the working machine pump capacity VL (cc/rev) by increasing the oil pressure in the bottom chamber of the capacity control cylinder 205d as the working machine load pressure P of the first pilot pressure receiving portion 205a increases.

An engine speed detecting means 207 comprises: a fixed displacement pump 207a, driven by the engine 201; an orifice 207b, through which the oil discharged from the fixed displacement pump 207a is passed; a relief valve 207c, for setting the downstream pressure of the orifice 207b at a fixed pressure value; and a pilot pressure control valve 207d, for controlling the pilot pressure inputted to the second pilot pressure receiving portion 205b responsive to the upstream pressure of the orifice 207b. As the engine speed N is reduced, the upstream pressure of the orifice 207b is reduced; therefore, the pilot pressure control valve 207d is switched to its position b. Therefore, the pilot pressure, which is inputted to the second pilot pressure receiving portion 205b, increases so as to be close to the downstream pressure of the orifice 207b, which is set at the fixed pressure by the relief valve 207c. The capacity control valve 205c is designed to reduce the working machine pump capacity VL as the pilot pressure inputted to the second pilot pressure receiving portion 205b is increasing, specifically, as the engine speed N is decreasing.

According to the configuration of the fifth embodiment, the working machine pump capacity control means 205 reduces the working machine pump capacity VL as the working machine load pressure P is increasing, and as the engine speed N is decreasing. For this reason, when the engine speed N is plotted in the axis of abscissa and the working machine pump capacity VL is plotted in the axis of ordinates in FIG. 10, the load pressure P varies from the higher value to the lower value in the range of predetermined engine speeds N1 to N2 as shown by the inclined straight lines. The gradient of these straight lines is determined by the spring constants of the capacity control spring 205e and the pilot spring 207e. The working pump capacity VL is not necessarily expressed by a linear function, provided it is expressed by an increasing function of the engine speed N; however, in order to facilitate the explanation, a case with a linear function will be explained below. Further, in FIG. 11, when the working machine load pressure P is plotted in the axis of abscissa and the working machine pump capacity VL is plotted in the axis of ordinates, the engine speed N varies from the higher value to the lower value in the range of predetermined working machine load pressures P11 to P12 as shown by the inclined straight lines. The gradient of these straight lines is determined by the spring constants of the capacity control spring 205e and the pilot spring 207e. In this case, the engine speed N is not necessarily expressed by a linear function.

Figure 10:
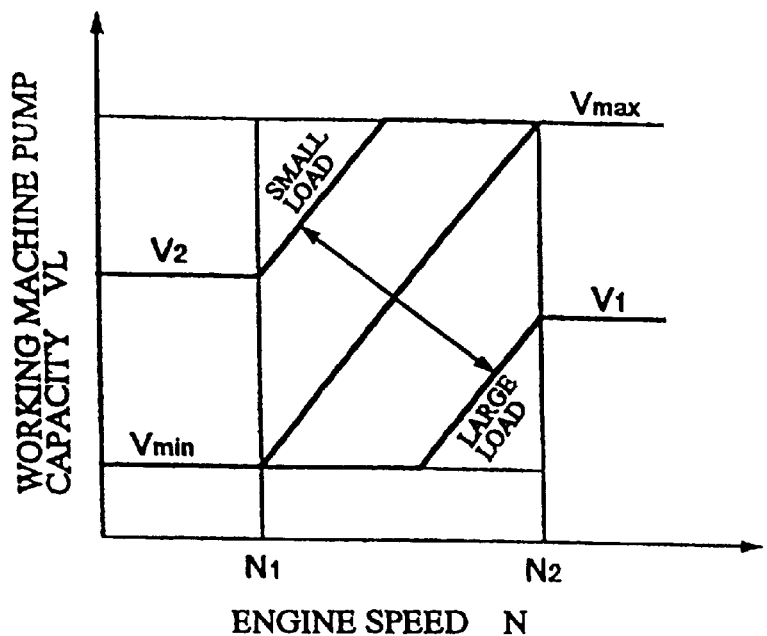
FIG. 10 is a graph showing the relationship between the engine speed and the working machine pump capacity of the fifth embodiment.
Figure 11:
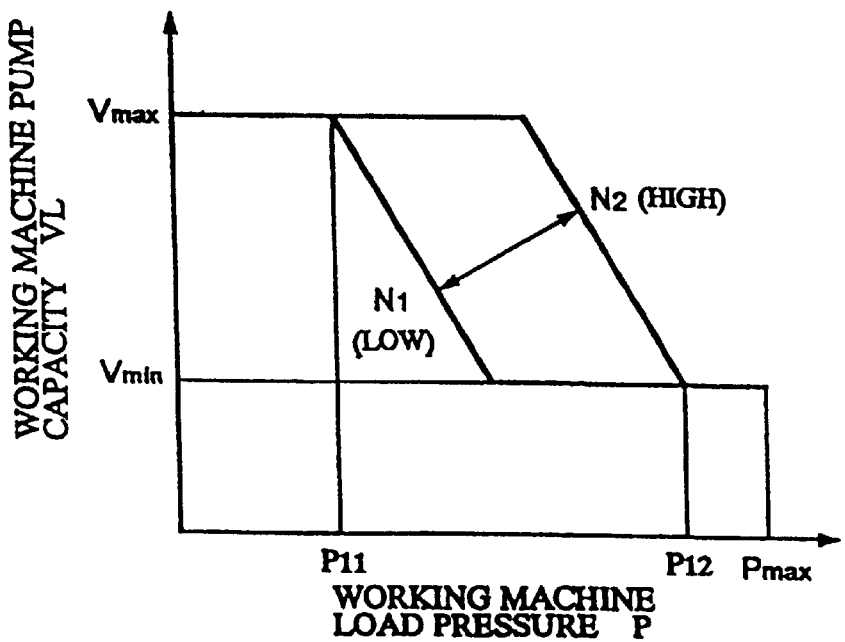
FIG. 11 is a graph showing the relationship between the working machine load pressure and the working machine pump capacity of the fifth embodiment.

In FIG. 12, the engine speed N is plotted in the axis of abscissa, and the working machine pump discharge QL ($cm^3$/min) is plotted in the axis of ordinates. When the predetermined straight line shown in FIG. 10 is expressed by the equation "VL=(k1*N)+k2" with k1 and k2 as constants, the working machine pump discharge QL in FIG. 12 is expressed by the equation "QL=VL*N=((k1*N)+k2)*N)=((k1*N2+(k2*N))". Thus the working machine pump discharge QL is a quadratic function of the engine speed N. Each of the capacities of the working machine pump shown in FIG. 12 has the relationship of Vmin<V1<V2<Vmax. For this reason, in the range of the predetermined engine speeds N1 to N2, the speed of the working machine in the area of the lower engine speeds close to the engine speed N1 is reduced earlier and the working machine driving horsepower is reduced earlier; therefore, the working vehicle is excellently accelerated. The speed of the working machine in the area of higher engine speeds close to the engine speed N2, such as for excavating, is increased or decreased in accordance with the load when changing from the lower speed area to the higher speed area; therefore, the operational efficiency of excavating and the like is increased.

As described above, according to the fifth embodiment, the following operational effects are obtained.

Figure 21:
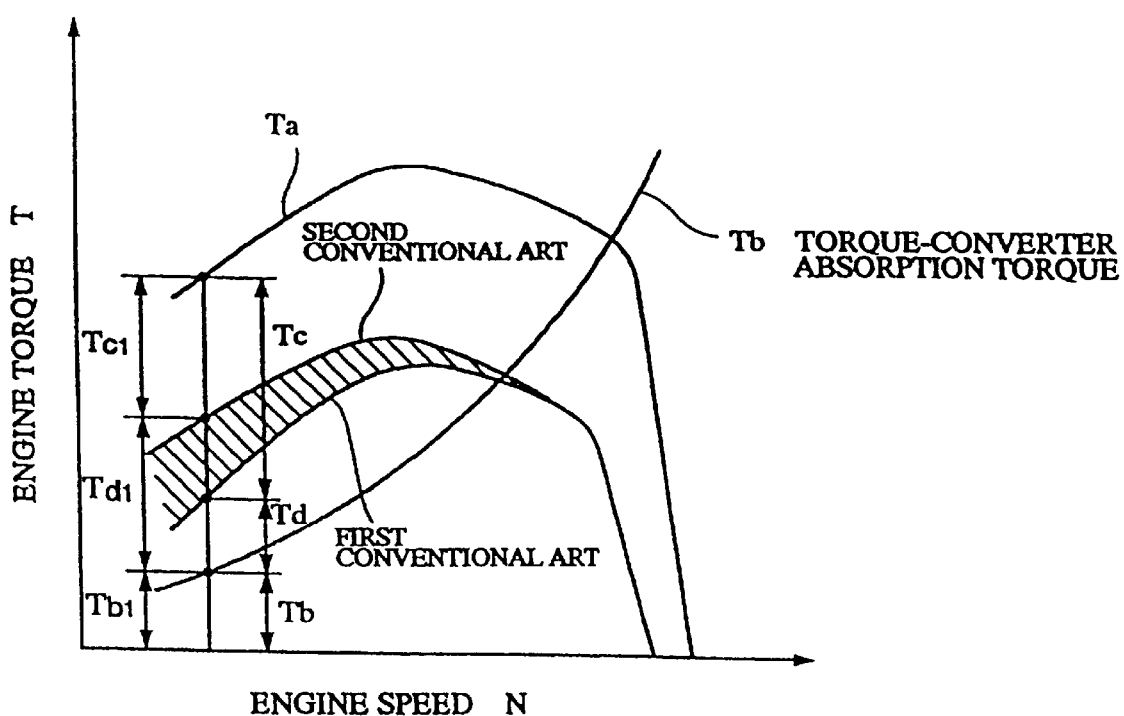
FIG. 21 is a graph of the engine torque property of a working vehicle of the first and the second conventional arts.
Figure 22:
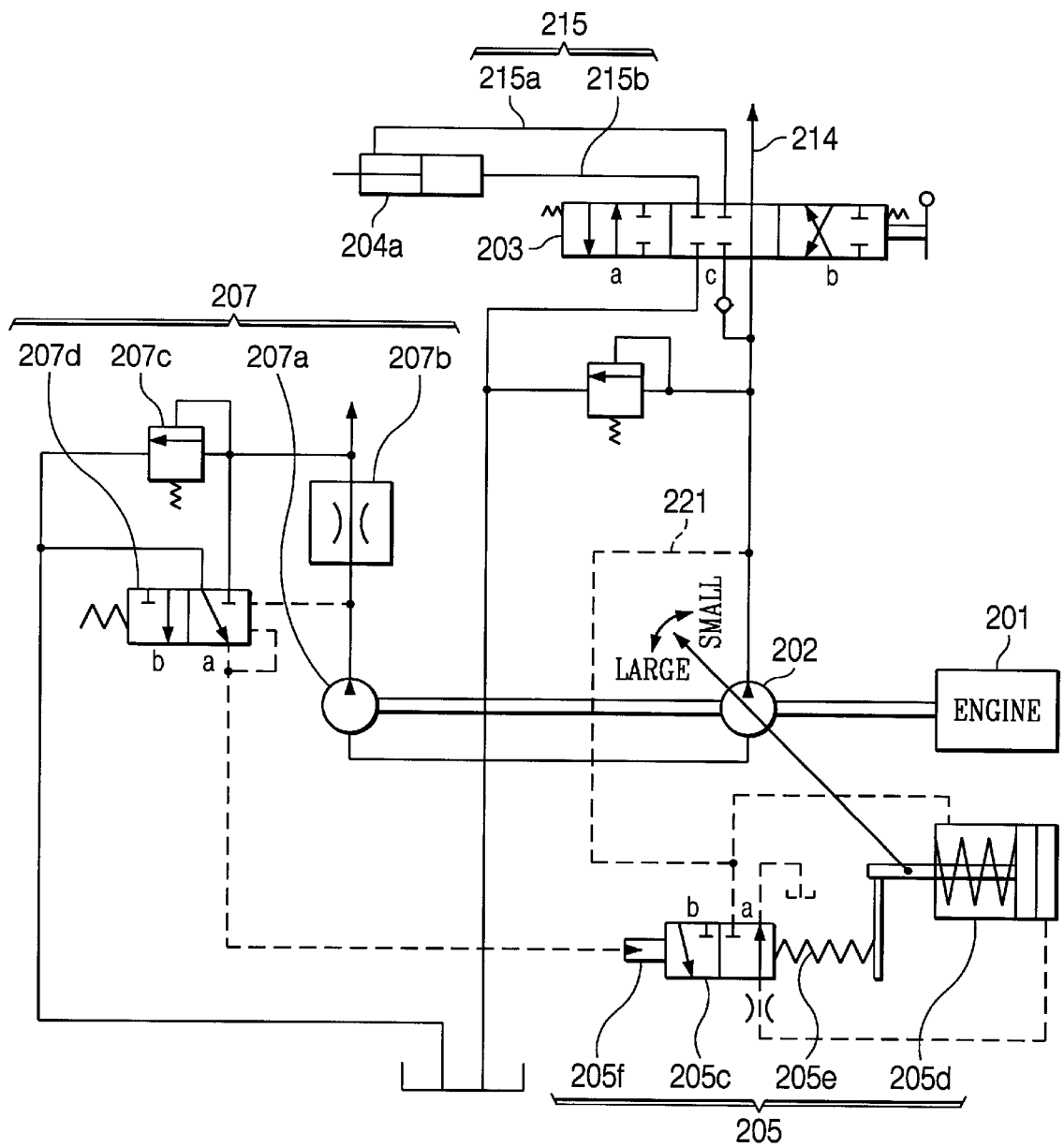
FIG. 22 is a diagram of a hydraulic circuit for a working vehicle in accordance with the second conventional art.

(1) When the working machine load is greater, as shown in FIG. 10, the working machine pump capacity VL is at a smaller value, and decreases with a decrease in the engine speed N. Accordingly, as shown in FIG. 21, the working machine torque Tc1 (proportional to VL*P) also decreases in the lower engine speed area, and the engine acceleration torque Td1 increases; therefore, the acceleration performance of the working vehicle is improved.

(2) When the working machine load is a lighter load, such as exists when the bucket is raised with no load, the working machine pump capacity VL is at a larger value, as shown in FIG. 10, and decreases with a decrease in the engine speed N. Accordingly, as shown in FIG. 21, the working machine torque Tc1 (proportional to VL*P) decreases in the lower engine speed area, and the engine acceleration torque Td1 increases; therefore, the acceleration performance of the working vehicle is improved.

(3) If the operating machine torque Tc1 (proportional to VL*P) under a lighter load is made to be almost the same as that under a greater working machine load, the working machine pump capacity VL can be made greater by the extent that the working machine load pressure P becomes lighter. Thereby, the working machine speed is increased to increase the operational efficiency, and even with a center bypass bleed-off type operation valve as in the present embodiment, the working machine pump discharge in the lower engine speed area is increased; therefore, the actuation pressure is raised faster, and the dead zone up to the working machine actuating point is decreased to improve the operability. The present invention is not limited to the center bypass bleed-off type operation valve.

Figure 13:
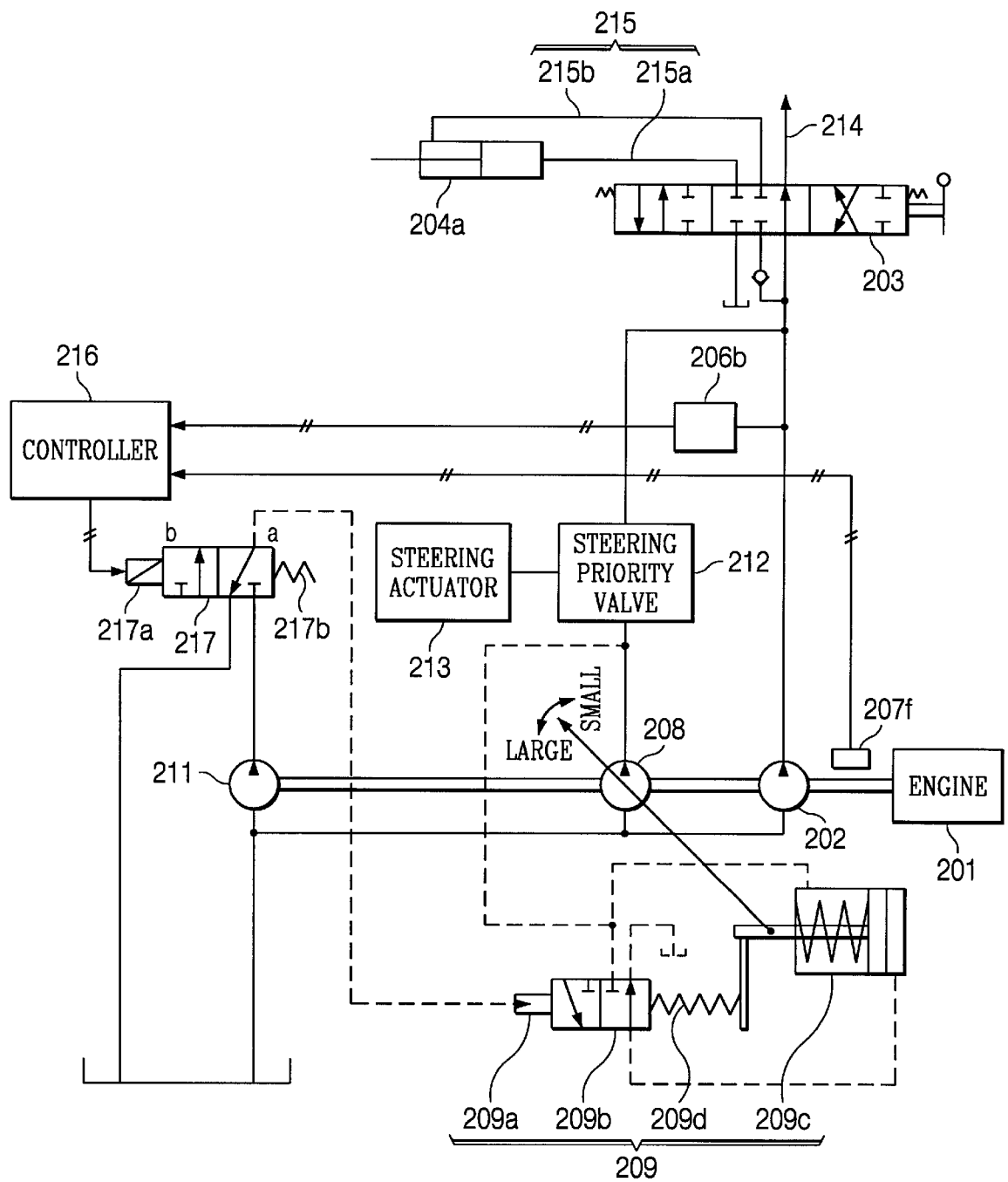
FIG. 13 is a diagram of a hydraulic circuit of a sixth embodiment according to the present invention.

The configuration in a sixth embodiment will be shown in FIG. 13. The engine 201 drives the working machine pump 202, a steering pump 208, and a control pump 211. The working machine pump 202 is connected to the working machine actuator 204a (in this embodiment, the hydraulic cylinder) via the operation valve 203. The output of the steering pump 208 is connected to the steering priority valve 212, with one outlet of the steering priority valve 212 being connected to the steering actuator 213, and a second outlet of the steering priority valve 212 being connected to the hydraulic cylinder 204a via the operation valve 203. The steering priority valve 212 preferentially supplies to the steering actuator 213 the steering required flow quantity Q0, shown in FIG. 14, from the steering pump discharge QSp. A controller 216 receives the working machine load pressure P, detected by a load pressure sensor 206b, and the engine speed N, detected by an engine speed sensor 207f, and controls the solenoid 217a of the proportional electromagnetic valve 217. A steering pump capacity control means 209 comprises: a capacity control valve 209b, which is provided with a pilot pressure receiving portion 209a; a capacity control cylinder 209c; and a capacity control spring 209d, coupling these components. The oil discharge from the control pump 211, which is controlled at a fixed original pilot pressure by a relief valve (not illustrated), is controlled by the proportional electromagnetic valve 217, and is supplied to the pilot pressure receiving portion 209a of the steering pump capacity control means 209. The steering pump capacity control means 209 controls the steering pump capacity VSp of the steering pump 208 in accordance with the pilot pressure of the pilot pressure receiving portion 209a.

According to the configuration of the sixth embodiment, the operations are as follows.

Figure 14:
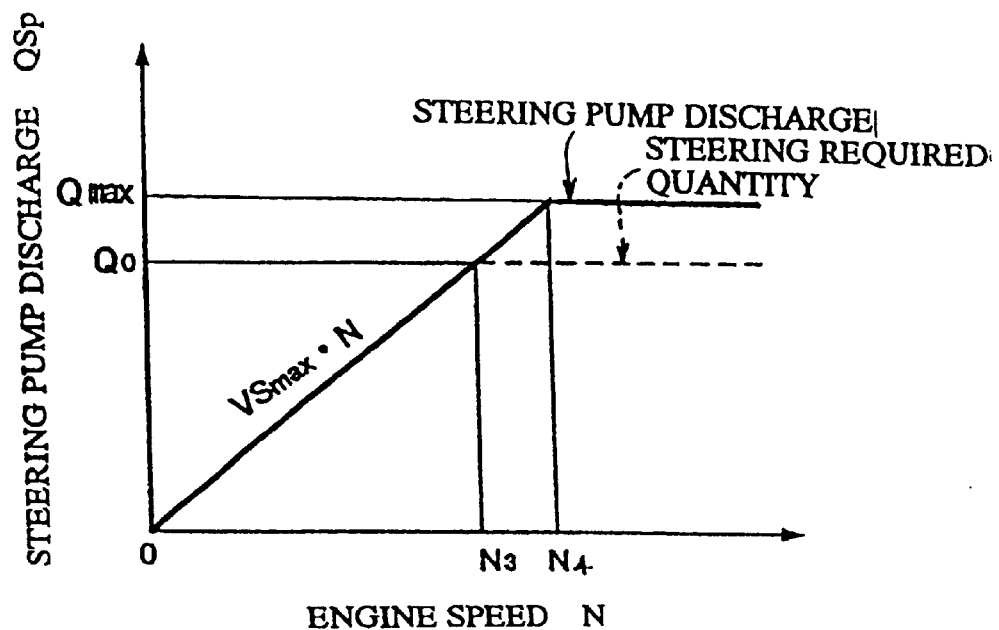
FIG. 14 is a graph showing the discharge quantity from a steering pump in the sixth embodiment when the working machine is not being operated.

(1) The pump capacity control of the steering pump 208, when the working machine is not operated, will be explained based on FIGS. 13 and 14.

When a detection signal of the load pressure sensor 206b, which is inputted into the controller 216, is not more than the predetermined load pressure P10, the controller 216 determines that the working machine is not operated. In this situation, the controller 216 outputs to the solenoid 217a a control signal to allow the steering pump 208 to have the maximum pump capacity VSmax until an engine speed signal, inputted from the engine speed sensor 207f, has a value corresponding to the engine speed N4. A predetermined value Qmax of the steering pump discharge QSp, determined by the maximum pump capacity VSmax and the engine speed N4, is set at the quantity required to operate the steering actuator 213 at a predetermined speed or higher, specifically, the value which can compensate the steering required flow quantity Q0. When the engine speed becomes N4 and the steering pump discharge QSp reaches the maximum value Qmax, the steering pump discharge QSp is controlled to maintain the predetermined value Qmax even if the engine speed exceeds N4. Specifically, a control signal by which the steering pump capacity VSp satisfies the equation "VSp=Qmax/N" is issued to the solenoid 217a of the proportional electromagnetic valve 217 to control the steering pump capacity control means 209.

(2) The steering pump capacity control during an operation of the working machine will be explained based on FIG. 13, and FIG. 15 to FIG. 17.

The controller 216 determines that the working machine is in operation when a detection signal, inputted from the load pressure sensor 206b, is not less than the predetermined load pressure P10. The controller 216 then moves the proportional electromagnet valve 217 in the direction of its position b, and outputs a control signal, which enables the achievement of the steering pump capacity VSp shown in FIG. 15, to the solenoid 217a of the proportional electromagnetic valve 217, based on each of the detection values from the load pressure sensor 206b and the engine speed sensor 207f, in order to decrease the steering pump capacity VSp as the working machine load pressure P increases and as the engine speed N decreases. When the pilot pressure, controlled by the proportional electromagnetic valve 217, is inputted to the pilot pressure receiving portion 209a of the steering pump capacity control means 209, the steering pump discharge QSp is obtained relative to the engine speed N as illustrated in FIG. 17.

Figure 15:
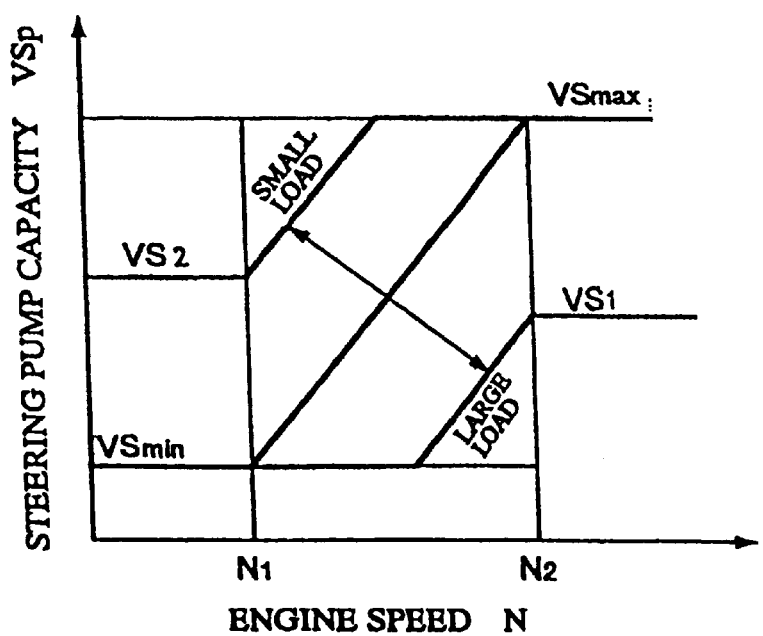
FIG. 15 is a graph showing the relationship between the engine speed and the steering pump capacity of the sixth embodiment.

In FIG. 15, the engine speed N is plotted in the axis of abscissa, and the steering pump capacity VSp is plotted in the axis of ordinates. In the range of the predetermined engine speeds N1 to N2, the load pressure P varies from the higher value to the lower value as shown by the inclined straight lines. The gradient of these inclined straight lines is determined by the spring constants of the capacity control spring 209d and the electromagnetic valve spring 217b. The steering pump capacity VSp is not necessarily a linear function, provided it is an increasing function of the engine speed N; however, in order to make the explanation simple and clear, a case with a linear function will be explained.

Figure 16:
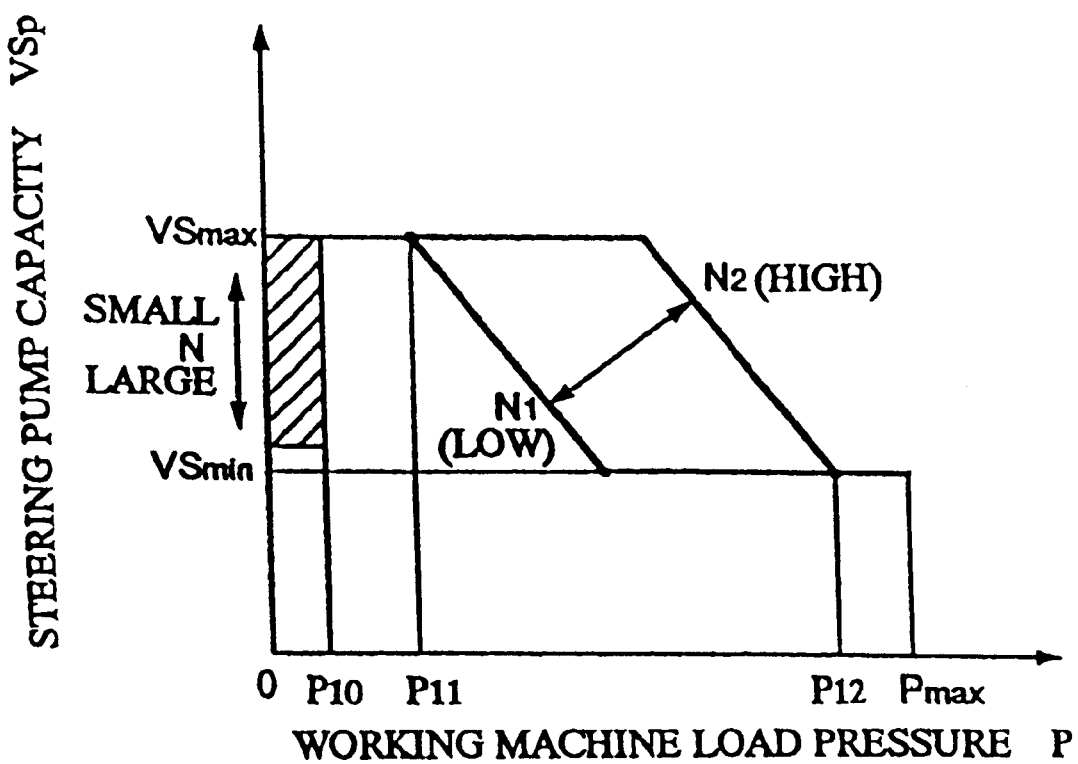
FIG. 16 is a graph showing the relationship between the working machine load pressure and the steering pump capacity of the sixth embodiment.

In FIG. 16, the working machine load pressure P is plotted in the axis of abscissa, and the steering pump capacity VSp is plotted in the axis of ordinates. In the range of the predetermined working machine load pressures P11 to P12, the engine speed N varies from the higher value to the lower value as shown by the inclined straight lines. The gradient of these inclined straight lines is determined by the spring constants of the capacity control spring 209d and the pilot spring 217b. In this case, as described-above, the steering pump capacity VSp is not necessarily a linear function of the working machine load pressure P. Further, when the working machine is not operated and the working machine circuit is not more than the predetermined load pressure P10, the steering pump capacity VSp varies within the range shown by the hatching lines in FIG. 16 in accordance with the engine speed N.

In FIG. 17, the engine speed N is plotted in the axis of abscissa, the steering pump discharge QSp is plotted in the upper axis of ordinates, and the working pump discharge QL is plotted in the lower axis of ordinates. If the predetermined line shown in FIG. 15 is expressed by the equation "VSp=(k3*N+k4)" with k3 and k4 as constants, the steering pump discharge QSp in FIG. 17 is expressed by the equation "QSp=VSp*N=((k3*N+k4)*N)=((k3*N$^2$)+(k4*N))" in the range of the engine speeds N1 to N2. Each of the steering pump capacities shown in FIG. 17 has the relationship VSmin<VS1<VS2<VSmax. Thus the steering pump discharge QSp becomes a quadratic function of the engine N. For this reason, in the range of the predetermined engine speeds N1 to N2, the speed of the working machine, in the lower engine speed area close to the engine speed N1, is reduced earlier and the working machine driving horsepower is reduced early; therefore, the acceleration performance of the working vehicle is increased. The speed of the working machine, in the higher engine speed area close to the engine speed N2 in excavating or the like, increases or decreases in accordance with the load when it is changed from a lower speed area to a higher speed area; therefore, the operation efficiency in excavating or the like is increased. Normally, with the engine idling speed N5, the steering pump capacity VSmin is set to be at the predetermined value Qmax of the steering pump discharged quantity, which can compensate the steering required flow quantity Q0. In this way, the amount made by subtracting the steering required flow quantity Q0 from the steering pump discharge QSp, i.e., (QSp−Q0), is added to the working machine pump discharge QL, which is supplied to the hydraulic cylinder 204a via the operation valve 203.

According to the aforesaid sixth embodiment, the following operational effects are provided as in the fifth embodiment.

(1) When the working machine load is greater, the steering pump capacity VSp is at a smaller value, and decreases as the engine speed N decreases as shown in FIG. 15. Accordingly, as shown in FIG. 21, the working machine torque Tc1 (proportional to (VSp+VL)*P) decreases in the lower engine speed area as shown in FIG. 21, and the engine acceleration torque Td1 increases; therefore, the acceleration performance of the working vehicle is improved.

(2) If the working machine load is smaller, as in the case that the bucket is raised with no load, the steering pump capacity VSp is at a larger value, and decreases as the engine speed N decreases as shown in FIG. 15. Accordingly, as shown in FIG. 21, in the lower engine speed area, the working machine torque Tc1 (proportional to (VSp+VL)*P) also decreases and the engine acceleration torque Td1 increases; therefore, the acceleration performance of the working vehicle is improved. In addition, the speed of the working machine, in the higher engine speed area close to the engine speed N2 in excavating or the like, increases or decreases in accordance with the load when it is changed from the lower speed area to the higher speed area; therefore, the working efficiency in excavating or the like is improved.

(3) If the working machine torque Tc1 (proportional to VSp*P) under a lighter load is made to be almost the same as that under greater working machine load, the steering pump capacity VSp can be made greater by the extent that the working machine load pressure P becomes lighter. As a result, the assisting flow to the hydraulic cylinder 204a can be increased, thereby increasing the working machine speed to increase operational efficiency. Further, even with a center bypass bleed-off type operation valve as in the present embodiment, the steering pump discharge QSp in the lower engine speed area is increased; therefore, the actuation pressure is raised faster, and the dead zone up to the working machine actuating point is decreased to improve the operability. The present invention is not limited to the center bypass bleed-off type operation valve.

(4) When the working machine is not operated, the steering pump discharge QSp is controlled so as not to exceed the predetermined quantity Qmax; therefore, the steering pump discharge QSp at a higher engine speed is reduced, and the production of needless power is reduced.

In the sixth embodiment, the controller 216, receiving the load pressure P detected by the load pressure sensor 206b and the engine speed N detected by the engine speed sensor 207f, controls the steering pump capacity control means 209 through the solenoid 217a of the electromagnetic valve 217. However, the present invention is not limited to this, and it may be suitable that the controller 216 directly controls the steering pump capacity control means 209 by means of a signal of the engine speed N and a signal of the working machine load pressure P as in the fifth embodiment.

Reasonable variation and modifications are possible within the scope of the foregoing description, the drawings and the appended claims to the invention.

That which is claimed is:

1. A pump capacity control device comprising:
   an engine;
   an engine speed sensor;
   a working machine hydraulic actuator;
   a working machine hydraulic pump which is driven by said engine and which drives said working machine hydraulic actuator;
   a working machine load detecting means;
   a steering actuator;
   a steering pump which is driven by the engine and which drives said steering actuator;
   a steering pump capacity control means for controlling steering pump capacity, which is a discharge quantity for one rotation of the steering pump; and
   a steering priority valve, for helpingly supplying pressurized oil, discharged from the steering pump, to the working machine actuator when the steering pump capacity is not less than an oil quantity which is necessary for the steering actuator;
   wherein said steering pump capacity control means reduces the steering pump capacity as the working machine load is increasing, based on a detection value from the working machine load detecting means, and as the engine speed is decreasing, based on a detection value of the engine speed sensor.

2. A pump capacity control device in accordance with claim 1, wherein the steering pump capacity control means controls the steering pump capacity so that the steering pump discharge does not exceed a predetermined value even if the engine speed is further increased, when the working machine load detecting means detects that the working machine load pressure is not more than a predetermined value and the steering pump discharge per unit time reaches a predetermined value as a result of an increase in the engine speed.

3. A pump capacity control device in accordance with claim 1, wherein said steering pump capacity control means comprises:
   a servo cylinder, for varying the displacement of said steering pump;
   a control valve for operating said servo cylinder, said control valve having a pressure receiving surface;
   a load pressure sensor;
   a proportional electromagnetic valve;

a control pump which supplies pressurized oil to said proportional electromagnetic valve;

conduit means for providing communication between said proportional electromagnetic valve and said pressure receiving surface;

a controller which receives a working machine load pressure value detected by said load pressure sensor and an engine speed value detected by said engine speed sensor, and which controls the proportional electromagnetic valve to connect said pressure receiving surface via said conduit means to either a drain or said control pump.

* * * * *